United States Patent [19]

Iwase et al.

[11] Patent Number: 4,873,581
[45] Date of Patent: Oct. 10, 1989

[54] FIELD/FRAME CONVERSION CIRCUIT

[75] Inventors: Yoshiki Iwase; Yasuhito Kobayashi, both of Tokyo, Japan

[73] Assignee: Fuji Photo Film Co. Ltd., Kanagawa, Japan

[21] Appl. No.: 261,624

[22] Filed: Oct. 24, 1988

Related U.S. Application Data

[62] Division of Ser. No. 46,710, May 7, 1987, Pat. No. 4,812,919.

[30] Foreign Application Priority Data

| May 8, 1986 | [JP] | Japan | 61-105749 |
| May 8, 1986 | [JP] | Japan | 61-105750 |
| May 8, 1986 | [JP] | Japan | 61-105753 |
| May 8, 1986 | [JP] | Japan | 61-105754 |
| Aug. 4, 1986 | [JP] | Japan | 61-182963 |

[51] Int. Cl.[4] .......................... H04N 5/76; H04N 9/79
[52] U.S. Cl. .................................. 358/310; 358/335; 360/9.1
[58] Field of Search .................. 358/21 R, 23, 38, 136, 358/160, 310, 312, 313, 314, 330, 335; 360/9.1, 10.1, 10.3, 11.1, 33.1, 35.1

[56] References Cited

U.S. PATENT DOCUMENTS

| 3,990,107 | 11/1976 | Hanma et al. | 360/10.1 X |
| 4,298,896 | 11/1981 | Heitmann | 360/11.1 X |
| 4,470,076 | 9/1984 | Arai et al. | 358/312 |
| 4,675,751 | 6/1987 | Yagi et al. | 360/35.1 X |
| 4,758,900 | 7/1988 | Kobayashi | 358/313 X |
| 4,766,506 | 8/1988 | Yogi et al. | 360/35.1 X |
| 4,783,703 | 11/1988 | Murakoski et al. | 358/313 |

Primary Examiner—W. B. Perkey
Attorney, Agent, or Firm—Birch, Stewart, Kolasch & Birch

[57] ABSTRACT

A field/frame conversion circuit for use in a magnetic recording/reproducing apparatus which magnetically records and reproduces still images or the like. In the field/frame conversion circuit, after the frequency of a field signal obtained from a magnetic recording medium such as a magnetic disc and composed of frequency-multiplexed brightness and chroma signals is converted into a higher frequency band than the frequency band of the brightness signal, the field signal is delayed in the frequency modulated state thereof 0.5 horizontal scan period necessary for the field/frame conversion by a signal delay line having a wide band frequency characteristic. The thus delayed field signal and an undelayed field signal are selected alternately at every one vertical scan period by signal switching means so as to perform the field/frame conversion.

10 Claims, 14 Drawing Sheets

FIELD/FRAME CONVERSION CIRCUIT

This application is a divisional of copending application Ser. No. 07/046,710, filed on May 7, 1987, now U.S. Pat. No. 4,812,919.

BACKGROUND OF THE INVENTION

1. Field of the Invention

The present invention relates to a field/frame conversion circuit for use in a magnetic recording/reproducing apparatus adapted to record and reproduce still images or the like and, in particular, to a field/frame conversion circuit in which, when a field signal reproduced from a magnetic recording medium is delayed one-half of a horizontal scan period in order to provide a frame signal, the field signal is delayed in a high frequency bandwidth.

2. Description of the Prior Art

In forming a television picture image, it is well known that an interlaced scanning is employed in a horizontal scanning in order to reduce flicker to the eyes. In the NTSC system, this interlaced scanning is a [2 to 1] interlaced scanning method. In the [2 to 1] interlaced scanning method, a picture (that is, a frame) is structured by superposing two rough pictures (that is, two fields) on each other, each of the fields being formed by means of one vertical scanning. Accordingly, the number of repetitions of frames is 30 times per second and the number of the field repetitions is 60 times per second. Also, odd fields and even fields are delayed from each other by 0.5 H where 1 H represents a horizontal scanning period.

By the way, when recording video signals in a recording medium such as a magnetic tape, a magnetic disc or the like, various kinds of recording methods are conventionally employed. Among them, for example, there is a method in which a video signal is divided into two signal components, that is, a brightness signal and a chroma signal, and the two divided signals are processed in a given manner and are then frequency modulated, before they are recorded into the magnetic recording medium.

For reproduction in such recording method, there is employed a so-called field/frame conversion technique in which the strong vertical correlation of the video signal is used to scan the same recorded portion twice so that a frame signal can be created from one kind of field signal. In the field/frame conversion technique, since the field can not be divided into odd fields and even fields simply by repeating the same field signal there are formed two kinds of signals, that is, a signal that is delayed 0.5 H from the field signal (0.5 H delay signal) and a signal that is not delayed (non-delay signal), and these two kinds of signals are switched so as to provide the odd and even fields.

In a field/frame conversion circuit to realize the above-mentioned field/frame conversion system, a 0.5 H delay line is used to to provide the signal that is delayed 0.5 H from the field signal and a charge coupled device (CCD) is employed in the 0.5 H delay line. The delay line using the CCD is not so good in S/N (signal-to-noise ratio) the frequency characteristic thereof does not exhibit a wide bandwidth and, therefore, the brightness signal and the chroma signal must be converted separately into the frame signal. This requires two kinds of different delay lines (that is, glass delay line and CCD delay line) which are different from each other in characteristic. The difference in characteristic between the glass and CCD delay lines results in a great difference of delay time between the brightness and chroma signals which can produce color discrepancies.

Also, in the above-mentioned field/frame conversion circuit, when the chroma signal is demodulated, there is employed a bandwith which is not suitable to demodulate the chroma signal, resulting in a distorted chroma signal.

It may be considered that, instead of the above-mentioned two different kinds of delay lines, the one CCD delay line is used as the delay line for the brightness and chroma signals and at least the brightness signal is delayed 0.5 H after it is demodulated.

However, in this case, there may be produced a slight level difference between the non-delay brightness signal and the 0.5 H-delayed brightness signal, which results in a flicker of 30 Hz. In order to prevent the production of such flicker, a complicated circuit configuration must be used.

SUMMARY OF THE INVENTION

The present invention aims at eliminating the drawbacks found in the above-mentioned prior art systems.

Accordingly, it is an object of the invention to provide a field/frame conversion circuit which can prevent color discrepancies and flickers which may be caused by delaying a brightness signal and a chroma signal 0.5 H separately using two different kinds of delay lines, and also which allows a simplified circuit configuration.

In order to attain the above object, according to the invention, there is provided a field/frame conversion circuit in which a non-delay signal which is a modulated field signal that is input repeatedly and which is supplied with no delay and a delay signal which is delayed 0.5 H (horizontal scanning period) are selected by switching means at each vertical scanning period to thereby provide a frame signal, characterized in that said input modulated field signal is a modulated field signal that is composed of at least two signals modulated and frequency multiplexed, and the 0.5 horizontal scanning period delay is performed in a state in which the frequency of the repeatedly input modulated field signal is once converted into a higher frequency.

It is another object of the invention to improve the reproduction characteristic of the chroma signal.

In accomplishing this object, according to the invention, after the modulated field signal comprising the frequency multiplexed brightness signal and chroma signal is converted into a frame signal, the chroma signal component of the frame signal is extracted from the frame signal, or the chroma signal is extracted from the above-mentioned modulated field signal, and then the frequency of the thus-extracted chroma signal is converted into a given bandwidth before it is demodulated.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 13 is a block diagram to show a structure of a demodulation circuit employed in the embodiment shown in FIGS. 11 and 12;

DETAILED DESCRIPTION OF THE INVENTION

Detailed description will hereunder be given of the preferred embodiments of a circuit for converting a field signal into a frame signal according to the present invention with reference to the accompanying drawings.

Figure 1:
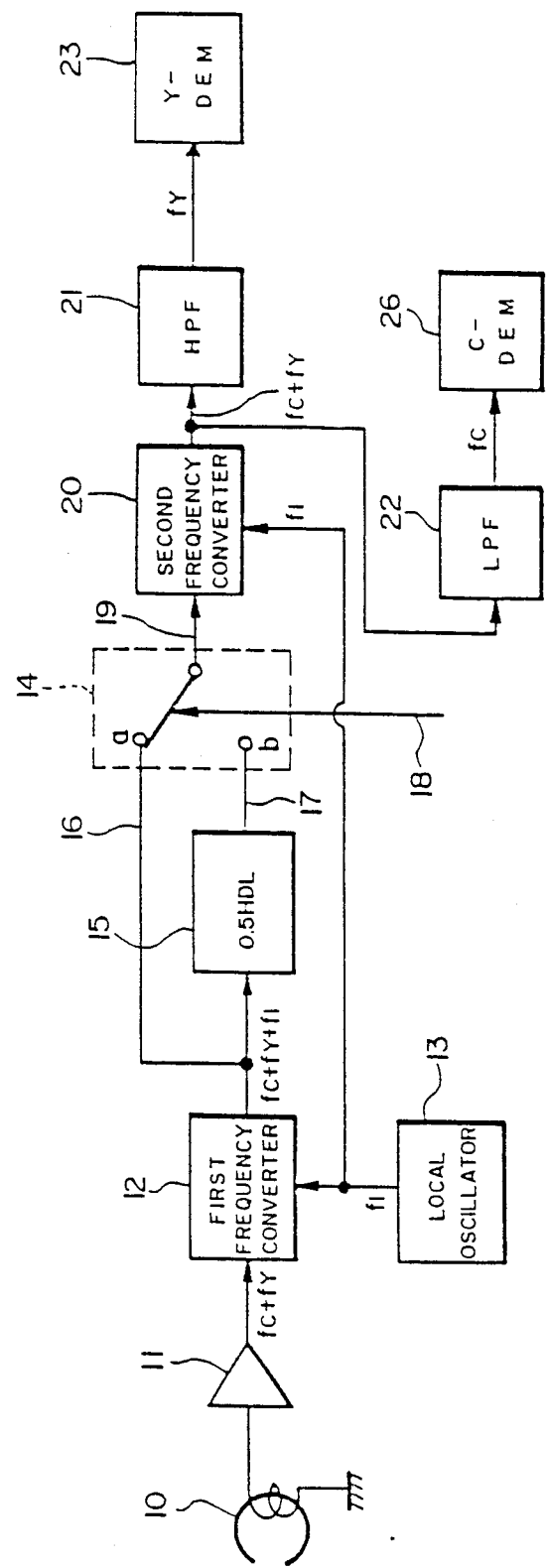
FIG. 1 is a block diagram of an embodiment of a reproducing system in a magnetic recording/reproducing apparatus to which the invention is applied.

Referring first to FIG. 1, there is illustrated in block form a structure of a reproducing system of a magnetic recording/reproducing apparatus to which the present invention is applied. In FIG. 1, a magnetic head 10 is connected to the input terminal of an amplifier 11 and the output terminal of the amplifier 11 is connected to the input terminal of a first frequency converter 12, whereby a field signal that is reproduced repeatedly by the magnetic head 10 is amplified by the amplifier 11 and is then supplied to the first frequency converter 12.

A signal having a given frequency f1 (for example, about 28 MHz) produced by in a local oscillator 13 is supplied to the first frequency converter 12, and in this first frequency converter 12 the above-mentioned signal (frequency f1) is mixed with the field signal to obtain a sum or difference signal thereof.

The above-mentioned field signal is composed of a brightness signal with a frequency bandwidth fy and a chroma signal with a frequency bandwidth fc, and thus it has a bandwidth of fc+fy (for example, 0~10 MHz).

The first frequency converter 12 outputs a signal having a frequency in a higher bandwidth of fc+fy+f1 (for example, 28~38 MHz) at the output of the circuit.

The output terminal of the first frequency converter 12 is connected to one contact a of a field/frame conversion switch 14 and is also connected via a 0.5 H delay line 15 to the other contact b of the field/frame conversion switch 14, so that the output signal (with a frequency of fc+fy+f1) of the first frequency converter 12 can be applied to the one contact a of the field/frame conversion switch 14 as well as to the other contact b of the field/frame conversion switch 14 via delay line 15.

Figure 3:
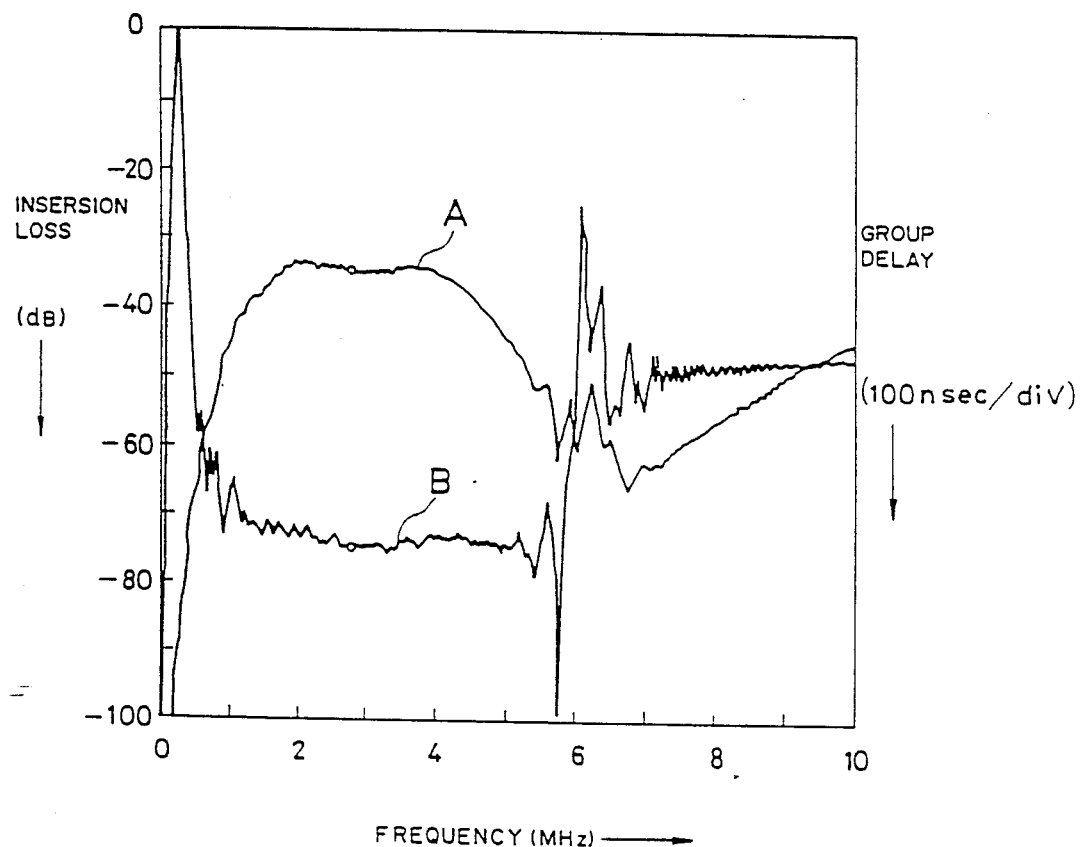
FIG. 3 is a characteristic view to show the frequency characteristic and group delay characteristic of a 0.5 H delay line.

Here, as the 0.5 H delay line 15, there is used a glass delay line which has a wide bandwidth frequency characteristic. The frequency characteristic and group delay characteristic of the glass delay line are shown in FIG. 3. In FIG. 3, it can be seen that a curved line A represents the frequency characteristic of the delay line and it has a bandwidth of 16~44 MHz. That is, since the frequency bandwidth of the output signal of the first frequency converter 12, as described above, is in the range of 28~33 MHz, when the above-mentioned delay line is used, then there can be obtained a sufficient bandwidth, so that the frequency characteristic of the glass delay line is satisfactory in practical use.

Also, a curved line B represents the group delay characteristic of the glass delay line and the width of variation of the delay time in the bandwidth of 16~44 MHz is within 100 n sec. The variation width of the delay time may give rise to color discrepancies but such color discrepancies can be practically neglected.

The above-mentioned field/frame conversion switch 14 is an analog switch which is adapted to select alternately a non-delay field signal 16 and a field signal 17 from the 0.5 H delay line 15 at each vertical scanning period (1 V) in accordance with a control signal 18 to convert into a frame signal 19. The output terminal of the field/frame conversion switch 14 is connected to a second frequency converter 20, so that the frame signal 19 from the conversion switch 14 can be supplied to the second frequency converter 20.

The above-mentioned second frequency converter 20 is a circuit which is adapted to take in a signal with oscillation frequency f1 from the local oscillator 13, mix the signal (frequency f1) with a frame signal (with the frequency of fc+fy+f1), and output a difference signal (with frequency of fc+fy) between these two signals. The output terminal of the second frequency converter 20 is connected through a high-pass filter to a brightness signal demodulation circuit 23, and is also connected through a low-pass filter 22 to a chroma signal demodulation circuit 26. The high-pass filter 21 is adapted to allow the brightness signal component (fy, for example, 2.5~10 MHz) of the output signal (fc+fy, for example, 0~10 MHz) output from the second frequency converter 20 to pass therethrough, so that the brightness signal component can be demodulated by the brightness signal demodulation circuit 23 into a brightness signal Y.

On the other hand, the low-pass filter 21 allows only the chroma signal component (fc, for example, 0~2.5 MHz) of the frame signal 19 to pass therethrough, so that the chroma signal component can be applied to the chroma signal demodulation circuit 26 where it can be demodulated into a chroma signal.

Next, description will be given of the operation of the above-constructed embodiment.

The field signal having the frequency bandwidth of fc+fy that is repeatedly reproduced by the magnetic head 10 is first amplified by the amplifier 11 and is then supplied to the first frequency converter 12. The field signal supplied to the first frequency converter 12 is mixed of a signal with a frequency f1 output from the local oscillator 13 and the mixed signal is output from the first frequency converter 12 as a sum signal component with a high frequency bandwidth (that is, a frequency of fc+fy+f1). The signal that is output from the first frequency converter 12 is divided into two signals; that is, a signal 16 which is supplied undelayed the contact a of the field/frame conversion switch 14; and, a signal 17 which is supplied through the 0.5 H delay line 15 to the other contact b of the switch 14. These two kinds of signals are selected alternately at each 1 V by the conversion switch 14 and converted into the frame signal 19 which is in turn supplied to the second frequency converter 20.

The frame signal 19 supplied to the second frequency converter 20 is mixed here with a signal output from the local oscillator 13 and thus it is converted again into a signal with a low frequency bandwidth (fc+fy). When the signal with a frequency (fc+fy) is supplied to the high-pass filter 21, then only the brightness signal component (fy) of the signal can be output from the high-pass filter 21. By applying the brightness signal component (fy) to the brightness signal demodulation circuit 23, the brightness signal Y can be obtained. Also, the signal with a frequency (fc+fy) is supplied to the low-pass filter 22, then only the chroma signal component (fc) is output from the low-pass filter 22. By applying the choma signal component (fc) to the chroma signal demodulation circuit 26, the chroma signal C can be obtained.

As described above, in this embodiment, a frequency modulated field signal comprising a brightness signal component and a chroma signal component both of which are frequency multiplexed in frequency is once converted into a signal which has a high frequency bandwidth, and the thus converted field signal is delayed only 0.5 H by a 0.5 H glass delay line which has a wide band frequency characteristic and a good group delay characteristic, before a frame signal is created. Therefore, according to the embodiment, a circuit configuration can be simplified and, since there is produced almost no difference in delay time between the brightness and chroma signals, there is eliminated the possibility that color discrepancies may be produced in a reproduced image.

Also, according to the embodiment, since the delay of the brightness and chroma signals is carried out in the frequency modulated states thereof prior to demodulation, there is eliminated the possibility that flicker may be produced.

Further, the 0.5 H glass delay line employed in the embodiment provides less signal degradation when compared with a CCD and, therefore, it is better in S/N (a signal-to-noise ratio) than the CCD. Accordingly, in accordance with the present embodiment, there can be obtained a frame signal which has a good S/N.

Figure 2:
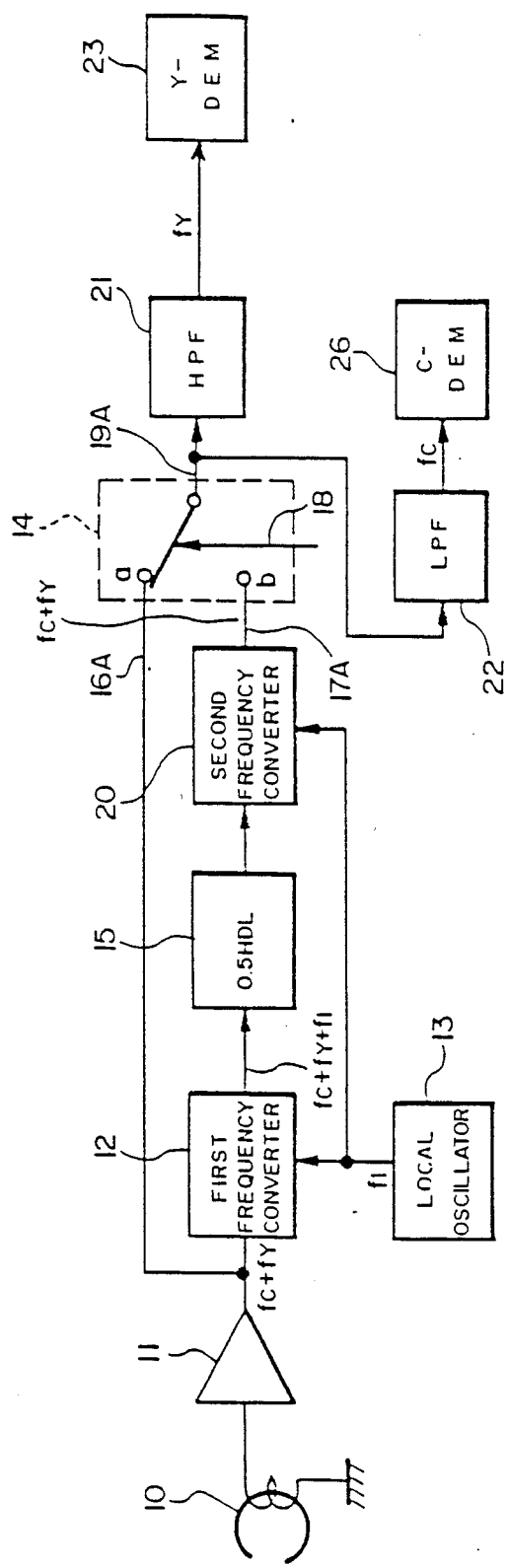
FIG. 2 is a block diagram of another embodiment of a reproducing system in a magnetic recording/reproducing apparatus to which the invention is applied.

Referring next to FIG. 2, there is shown another embodiment of a reproducing system employed in a magnetic recording/reproducing apparatus to whcih the invention is applied.

Also in this embodiment, the same parts thereof as in the above-mentioned first embodiment are given the same reference characters for convenience of explanation.

The embodiment shown in FIG. 2 is different in structure from the embodiment in FIG. 1 in that it performs the field/frame conversion in lower frequencies (for example, 0~10 MHz), but the embodiment in FIG. 2 is similar to the embodiment in FIG. 1 in that a field signal is delayed 0.5 H in high frequency bandwith by use of a glass delay line having a wide frequency bandwidth, which is the subject matter of the present invention. In other words, according to the circuit configuration of the embodiment shown in FIG. 2, a field signal with a frequency of fc+fy which is repeatedly reproduced by the magnetic head 10 is amplified by the amplifier 11 and the field signal is then divided into two signals: one being a signal 16A to be supplied intact to one contact a of the field/frame conversion switch 14; and the other being a signal 17A which is supplied to the other contact b of the conversion switch 14 after it is once converted by the first frequency converter 12 into a signal with a high frequency of fc+fy+f1 (for example, 28~38 MHz), is delayed 0.5 H, and is then converted by the second frequency converter 20 to a signal with its initial frequency of fc+fy (for example, 0~10 MHz). The switch 14 is adapted to select the above-mentioned signals 16A and 17A alternately at each 1 V according to a control signal so as to obtain a frame signal 19A. The frame signal 19A which is obtained from the switch 14 is then applied to a high-pass filter 21 and a low-pass filter 22.

The high-pass filter 21 is structured such that the output thereof is supplied to a brightness signal demodulation circuit 23.

The low-pass filter 22 is a circuit which permits to pass through only the chroma signal component with a frequency of fc (for example, 0~2.5 MHz) of the frame signal 19A. The chroma signal component that has passed through the low-pass filter 22 is then applied to a chroma demodulation circuit 26 to provide a chroma signal.

Description will be given below of the embodiment shown in FIG. 2.

The field signal that is reproduced repetitively by the magnetic head 10 is first amplified by the amplifier 11 and it is then applied to the one terminal a of the abonementioned switch 14 as well as to the first frequency converter 12. The field signal that is applied to the first frequency converter 12 is once converted into a signal with a high frequency of (fc+fy+f1) and is then supplied to a 0.5 H delay line 15. The field signal that is delayed only 0.5 H by the 0.5 H delay line 15 is converted again by second frequency converter 20 to a signal with a low frequency of (fc+fy) and is then applied to the other contact b of the switch 14. The signal 16A to be applied to the one terminal a of the switch 14 and the signal 17A to be applied to the other terminal b thereof can be selected alternately to provide the frame signal 19A.

The frame signal 19A is applied via the high-pass filter 21 to the brightness signal demodulation circuit 23 to provide a brightness signal Y.

Also, when the frame signal 19A is passed through the low-pass filter 22, then only the chroma signal component (fc) thereof is extracted therefrom, and the chroma signal component (fc) is then applied to the chroma signal demodulation circuit 26 to provide a provide a chroma signal C.

The embodiment shown in FIG. 2 can provide several effects similar to those of the before-mentioned embodiment shown in FIG. 1. In addition to them, the present embodiment has a further effect that the circuit configuration thereof can be simplified since a switching operation for field/frame conversion can be performed in a lower frequency band.

Figure 4:
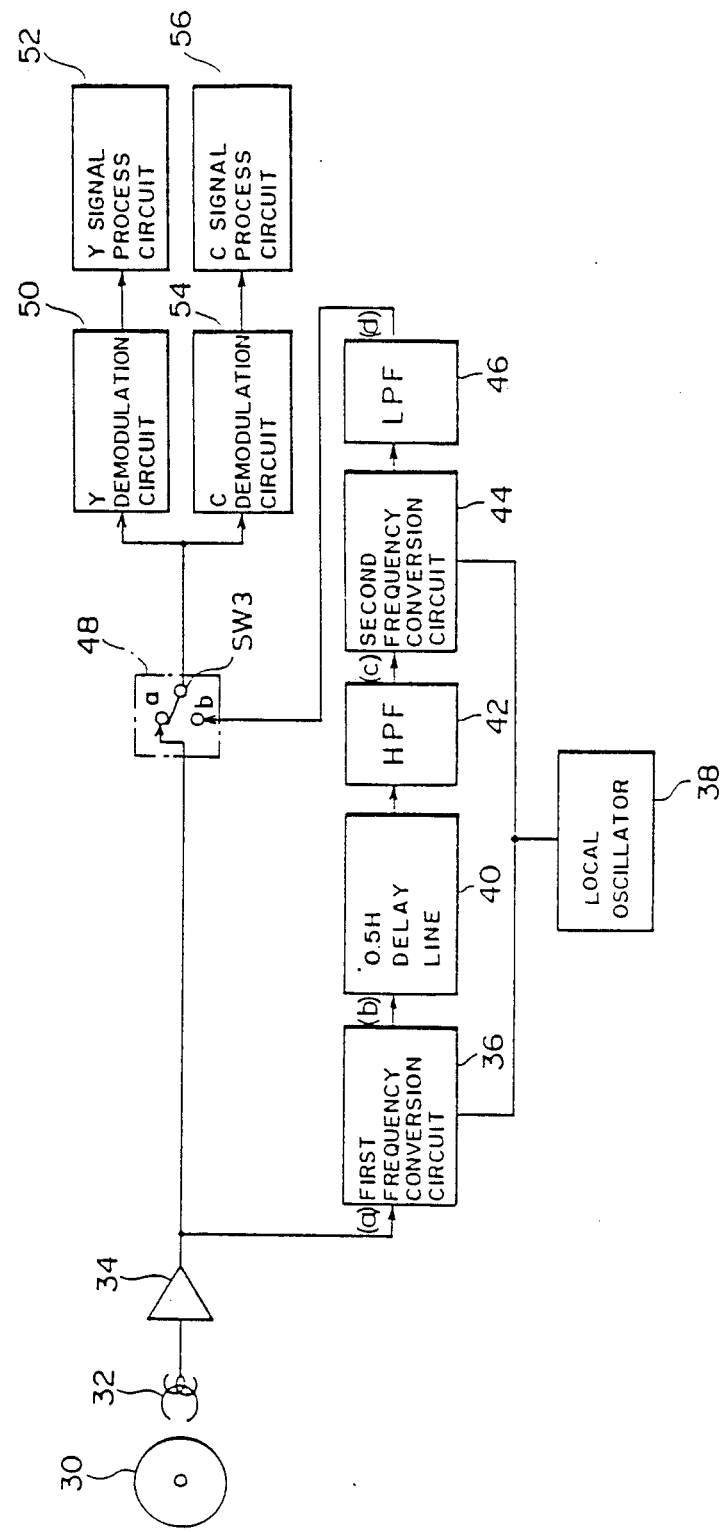
FIG. 4 is a block diagram of still another embodiment of a reproducing system in a magnetic recording/reproducing apparatus to which the invention is applied.

Referring next to FIG. 4, there is illustrated a third embodiment of a reproducing system in a magnetic recording/reproducing appratus S to which the invention is applied.

In FIG. 4, reference character 30 designates a magnetic disc; 32 a magnetic head adapted to reproduce a field signal which is composed of a frequency modulated (FM) brightness signal Y (for example, with a frequency bandwidth fy=2.5~12 MHz) and an FM chroma signal C (for example, with a frequency bandwidth $fc$=0.15~2.5 MHz) respectively recorded on a track of the magnetic disc 30; 34 an amplifier adapted to amplify the field signal that is reproduced by the magnetic head 32; 36 a first frequency conversion circuit adapted to convert the field signal output from the amplifier 34 to a signal with a given higher frequency; 38 a local oscillator adapted to supply a signal with a given frequency fl (for example, 14 MHz) to the first frequency conversion circuit 36 as well as a second frequency conversion circuit 44 to be described later; 40 a 0.5 H glass delay line (for example, with an operation frequency of 14~26 MHz) which is used to delay the field signal output from the first frequency conversion circuit 36 only by 0.5 H; 42 a high-pass filter which permits to pass through the upper side band portion (with a frequency of 14~26 MHz) of the side band of the field signal that is output through the 0.5 H delay line 40; 44 a second frequency conversion circuit adapted to convert the field signal output through the high-pass filter 42 into a field signal with a given lower frequency; and, 46 a low-pass filter adapted to permit to pass through the field signal (with a frequency of 0.15~12 MHz) output from the second frequency conversion circuit 44. In addition, 48 designates a signal switch circuit adapted to select a field signal that is supplied direct from the amplifier 34 and a field signal that is delayed 0.5 H; 50 an FM brightness signal demodulation circuit adapted to demodulate an FM brightness signal Y of a frame signal output through the signal switch circuit 48; 52 a signal process circuit which comprises a de-emphasis circuit to correct the characteristic of the brightness signal Y demodulated by the FM brightness signal demodulation circuit 50 such that the pre-emphasis chracteristic of the brightness signal Y that is given thereto when it is recorded is corrected into an inverted characteristic, and other circuits; and, 56 a signal process circuit which comprises a de-emphasis circuit to correct the characteristic of the chroma signal C demodulated by an FM chroma signal demodulation circuit 54 such that the pre-emphasis characteristic of the chroma signal C given thereto when it is recorded is converted to an inverted characteristic, and other circuits.

Next, description will be given of the operation of the above-structured embodiment in connection with FIG. 5.

Figure 5:
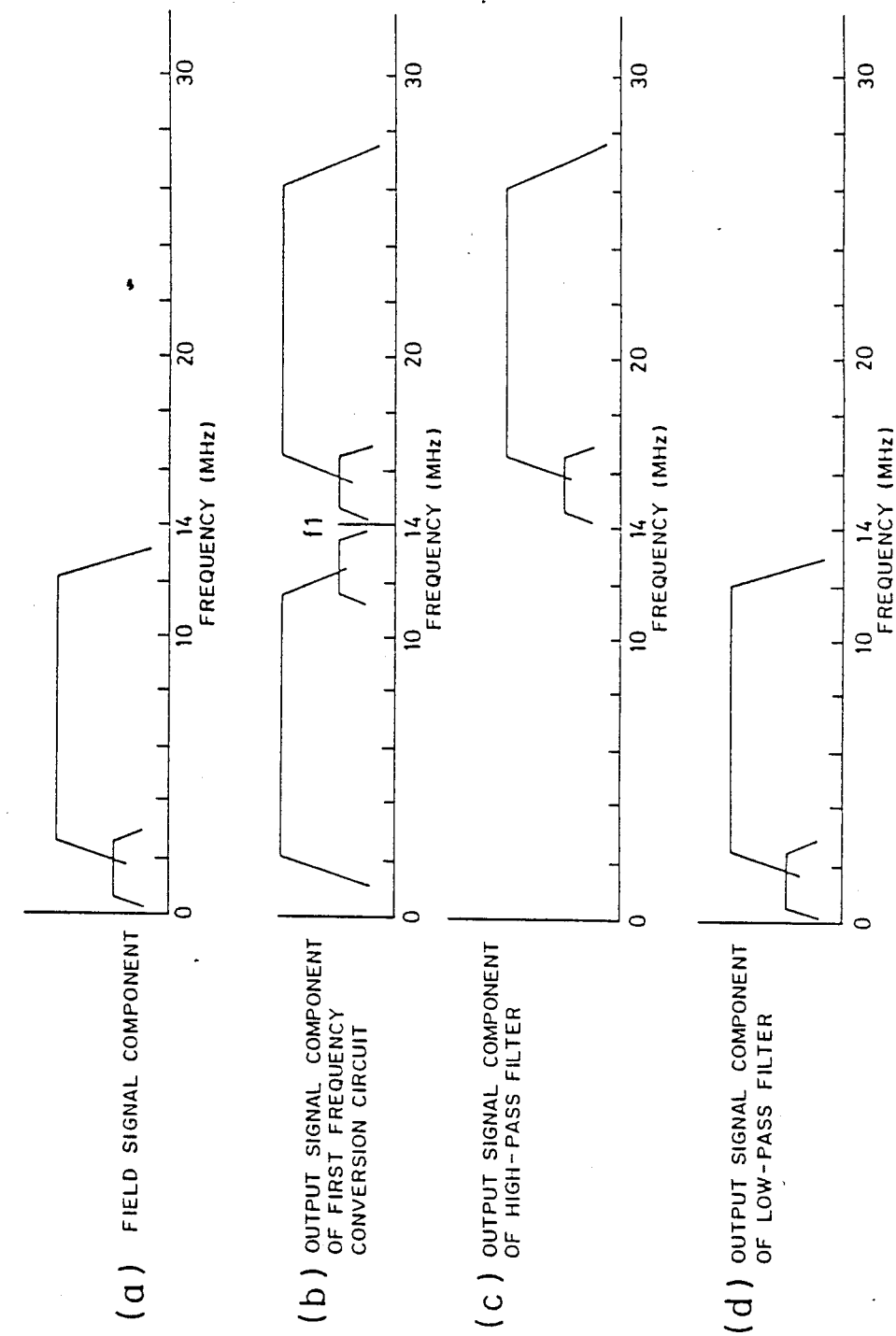
FIG. 5 is a characteristic view to show the frequency characteristic of a field signal employed in the embodiment shown in FIG. 4.

The field signal that is recorded on the track of the magnetic disc 30 is reproduced repeatedly by the magnetic head 32 (FIG. 5 (a)) and is then amplified by the amplifier 34, before the field signal is supplied to the contact a of a switch SW3 of the signal switch circuit 48. Also, the field signal output from the amplifier 34 is supplied to the first frequency conversion circuit 36, where the field signal is mixed with a signal with a frequency fl output by the local oscillator 38 to provide a difference signal component (lower side bands f1−fc, f1−fy) and a sum signal component (upper side bands f1+fc, f1+fy) (FIG. 5 (b)), which are then supplied through the 0.5 H glass delay line 40 to the high-pass filter 42. Such field signal is structured such that the upper side bands are set in a frequency band in the neighborhood of a primary side band of the FM brightness signal Y and higher than 10 MHz. The high-pass filter 40 allows only the sum signal component in a frequency band higher than the frequency f1 (for example, a signal component with a frequency of 14 MHz or higher) of the sum and difference signal components of the field signal to transmit therethrough, and the sum signal component is then supplied to the second frequency conversion circuit 44. In the second frequency conversion circuit 44, the sum signal component is mixed with the signal with the frequency f1 coming from the local oscillator 38 to be converted again to a field signal having a low frequency (fc+fy). Then, the low frequency field signal is passed through the low-pass filter 46 and is then supplied to the contact b of the switch SW3 of the signal switch circuit 48. The field signal that is supplied from the amplifier 34 direct to the signal switch circuit 48 and the field signal that is supplied after it is delayed by 0.5 H are selected alternately at each of 1 V by the switch SW3 to be supplied to the demodulation circuits 50, 54 as the frame signal. The FM brightness signal Y of the frame signal is demodulated by the FM brightness signal demodulation circuit 50 and the thus demodulated brightness signal is given corrections such as a de-emphasis correction and the like by the signal process circuit 52. Also, the FM chroma signal C of the frame signal is demodulated by the FM chroma signal demodulation circuit 54 and the thus demodulated chroma signal is given corrections such as a de-emphasis correction and the like by the signal process circuit 56. And, based on the brightness signal Y output from the signal process circuit 52 as well as on the chroma signal from the signal process circuit 56, a video signal of a given frame can be composed.

As described above, in the above embodiment, the field signal in which the brightness signal component and chroma signal component thereof are frequency modulated and frequency multiplexed is once converted to a signal having a higher frequency band, the converted field signal is delayed only by 0.5 H by the 0.5 H glass delay line which has a wide band frequency characteristic, and the delayed field signal is converted again to a field signal with its original frequency, before the frame signal is created. Therefore, according to the present embodiment, a circuit configuration can be simplified and, since there is produced almost no difference in delay time between the brightness and chroma signals, there is eliminated the possibility that color discrepancies may be produced in the image reproduced.

Also, according to the present embodiment, since the delay of the brightness and chroma signals is performed prior to demodulation thereof, there is eliminated the possibility of flickers being produced.

Figure 6:
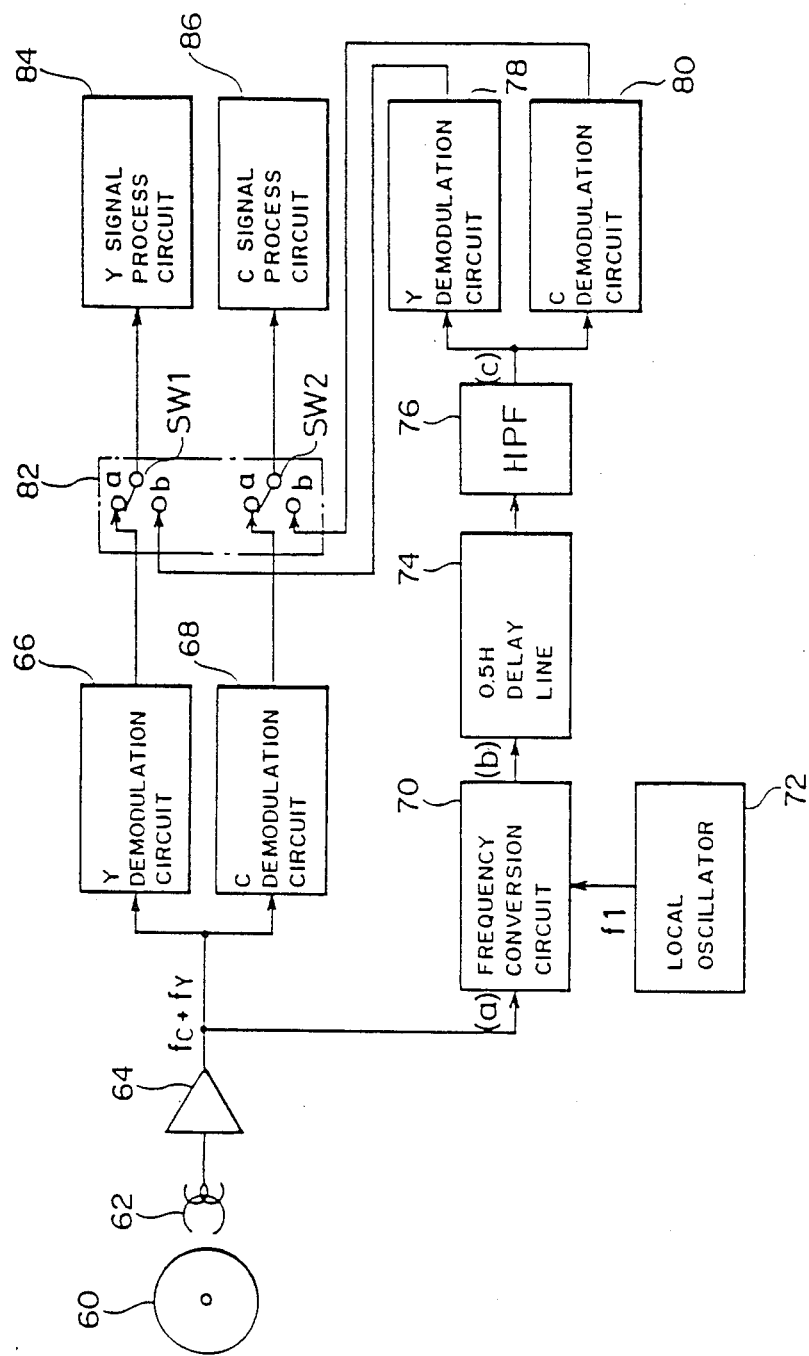
FIG. 6 is a block diagram of yet another embodiment of a reproducing system in a magnetic recording/reproducing apparatus to which the invention is applied.

Referring next to FIG. 6, there is illustrated a further embodiment of a reproducing system employed in a magnetic recording/reproducing apparatus to which the invention is applied.

In FIG. 6, a reference character 60 designates a magnetic disc which is one of magnetic recording mediums; 62 a magnetic head adapted to reproduce a field signal which is composed of a frequency modulated (FM) brightness signal Y (for example, a signal with a frequency bandwidth of fy=2.5~12 MHz) and an FM chroma signal C (for example, a signal with a frequency bandwidth of fc=0.15~2.5 MHz) respectively recorded on the track of the magnetic disc 60; 64 an amplifier adapted to amplify the field signal that is reproduced by the magnetic head 62; 66 an FM brightness signal demodulation circuit adapted to demodulate the FM brightness signal Y of the field signal output from the amplifier 64; and, 68 an FM chroma signal demodulation circuit adapted to demodulate the chroma signal C. Also, numeral 70 designates a frequency conversion circuit adapted to convert the field signal output from the amplifier 64 into a field signal which has a frequency higher than that of the FM brightness signal Y; 72 a local oscillator adapted to supply a signal with a given frequency f1 (for example, 14 MHz) to the frequency conversion circuit 70; 74 a 0.5 H glass delay line (for example, a line having an operation frequency of 14~26 MHz) adapted to delay the field signal output from the frequency conversion circuit 70 only by 0.5 H; 76 a high-pass filter which allows only the upper side band portion (in the frequency range of 14~26 MHz) of the side band of the field signal that is output through the 0.5 H glass delay line to pass therethrough; 78 an FM brightness signal demodulation circuit adapted to demodulate the FM brightness signal Y of the field signal that has passed through the high-pass filter 76; and, 80 an FM chroma signal demodulation circuit adapted to demodulate the FM chroma signal C of the field signal. In addition, 82 designates a signal switch circuit which comprises a switch SW1 to select the demodulated brightness signals Y respectively output from the FM brightness signal demodulation circuit 66 and FM brightness signal demodulation circuit 78, and a switch SW2 to select the demodulated chroma signal C respectively output from the FM chroma signal demodulation circuit 68 and FM chroma signal demodulation circuit 80; 84 a signal process circuit which comprises a de-emphasis circuit adapted to correct the characteristic of the brightness signal Y that is output via the switch SW1 of the signal switch circuit from the pre-emphasis characteristc that is given when the signal is recorded to the reversed characteristic thereof, and other circuit; and, 86 a signal process circuit which comprises a de-emphasis circuit adapted to correct the characteristic of the chroma signal C output via the switch SW2 from the pre-emphasis characteristic given in recording to the reversed characteristic thereof, and other circuits.

Next, description will be given below of the operation of the above-structured embodiment in connection with FIG. 7.

Figure 7:
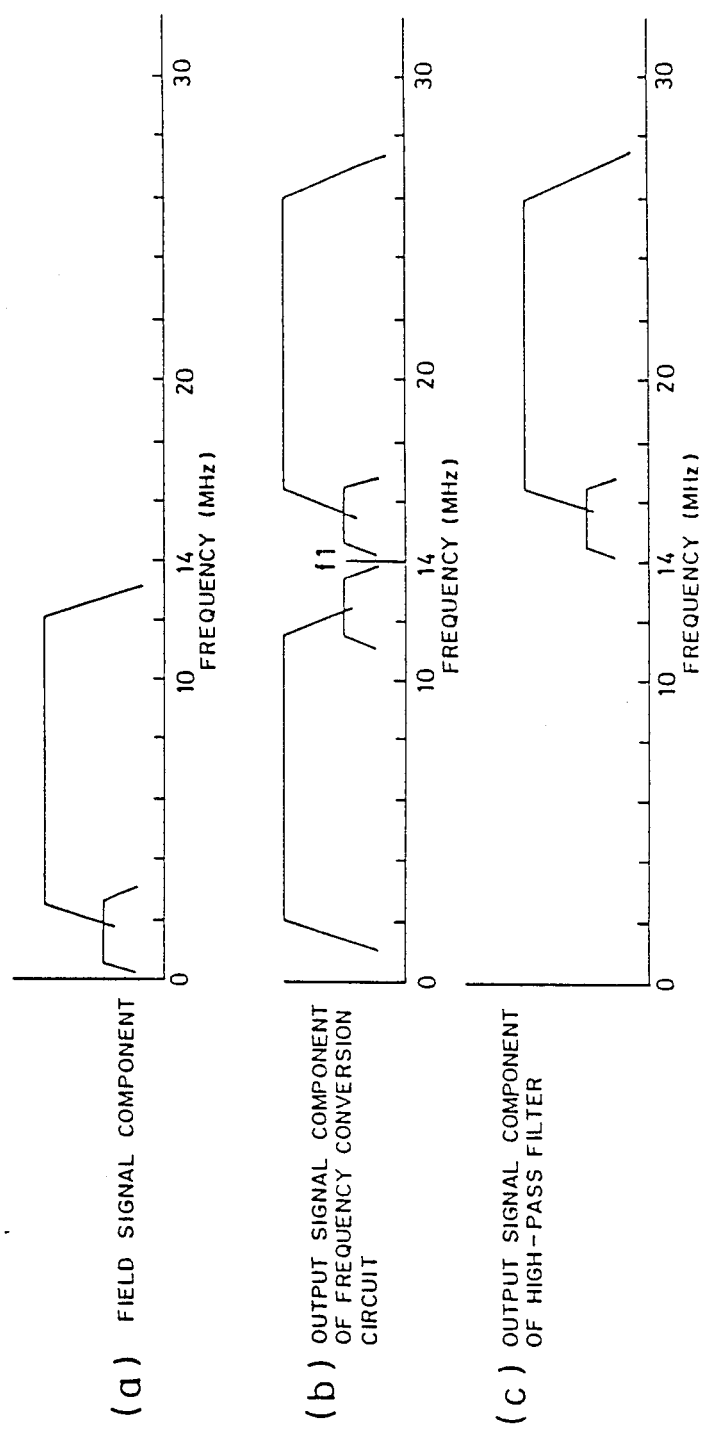
FIG. 7 is a characteristic view to show the frequency characteristic of a field signal employed in the embodiment shown in FIG. 6.

The field signal that is recorded on the track of the magnetic disc 60 is repetitively reproduced by the magnetic head 62 (FIG. 7 (a)), and the field signal is then amplified by the amplifier 64 before it is supplied to the FM brightness signal demodulation circuit 66 and FM chroma signal demodulation circuit 68. Then, the brightness signal Y that is demodulated by the demodulation circuit 66 is supplied to the contact a of the switch SW1 and the chroma signal C demodulated by the demodulation circuit 68 is supplied to the contact a of the switch SW2, respectively. Also, the field signal output from the amplifier 64 is supplied to the frequency conversion circuit 70 where it is then mixed with the signal with the frequency of f1 output from the local oscilator 72, with the result that the mixed signal is output from the conversion circuit 70 in the form of a difference signal component thereof (in the lower side bands, f1−fc, f1−fy) and in the form of a sum signal component thereof (in the upper side bands, f1+fc, f1+fy) (FIG. 7(b)) and is then supplied through the 0.5 delay line 74 to the high-pass filter 76. The high-pass filter 76 transmits only the sum signal component in the band (for example, a signal component with a frequency of 14 MHz or higher) higher than the frequency f1 out of the above-mentioned sum and difference signal components of the field signal and the sum signal component is then supplied to the demodulation circuit 78, 80 (FIG. 7(c)). Then, the brightness signal Y that is demodulated by the demodulation circuit 78 is supplied to the contact b of the switch SW1 of the signal switch circuit 82, and the chroma signal C demodulated by the demodulation circuit 80 is then supplied to the contact b of the switch SW2 of the signal switch circuit 82. The respective brightness signals respectively supplied to the contacts a and b of the switch SW1 of the signal switch circuit 82 are selected alternately at every one vertical scan period (V) and thus each of the brightness signals is then supplied to the signal process circuit 84 as the brightness signal Y of the frame. Also, the respective chroma signals C respectively supplied to the contacts a and b of the switch SW2 of the signal switch circuit 82 is selected alternately at every 1 V, similarly as in the brightness signals Y, and each of them is then supplied to the signal process circuit 86 as the frame chroma signal C. And, based on the brightness signal Y that is processed by the signal process circuit 84 such as the de-emphasis correction or the like as well as on the chroma signal C processed by the signal process circuit 86 such as the de-emphasis correction or the like, a video signal of a given frame can be composed.

As described above, in the present embodiment, the frequency modulated field signal composed of brightness and chroma signal components whose frequencies are multiplexed is once converted into a field signal in a high frequency band in which a relatively better demodulation characteristic can be obtained by a demodulator, and the high frequency band field signal is then delayed only 0.5 H by a 0.5 H glass delay line which has a wide band frequency characteristic, before a frame signal is created. Therefore, according to the present embodiment, a circuit configuration can be simplified and also since there is almost no difference in delay time between the brightness and chroma signals, there is eliminated the possibility that color discrepancies may be produced in a reproduced image.

Also, according to the present embodiment, due to the fact that the brightness and chroma signals are both delayed before they are demodulated, there is eliminated the possibility that flickers may be produced.

Figure 8:
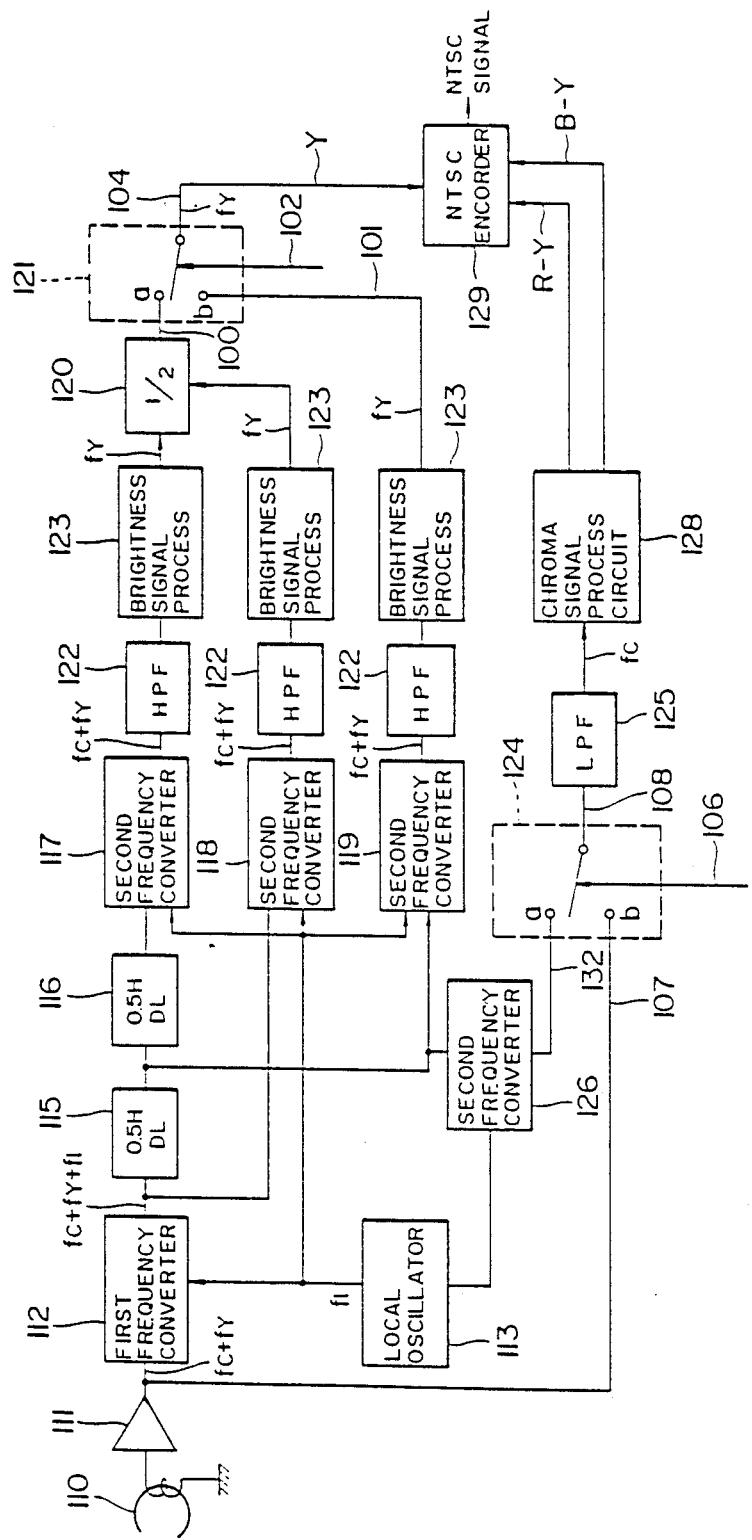
FIG. 8 is a block diagram of a further embodiment of a reproducing system in a magnetic recording/reproducing apparatus to which the invention is applied.

Referring next to FIG. 8, there is shown a still further embodiment of a reproducing system in a magnetic recording/reproducing apparatus to which the invention is applied.

This embodiment, as in the before-mentioned embodiments, aims at preventing the occurrences of color discrepancies and flickers found in the prior art systems due to the fact that two kinds of delay lines are used to delay the brightness and chroma signals 0.5 H separately. Especially, this embodiment is applied to prevent a vertical jitter (which is referred to as V jitter hereinafter) which may occur when a field signal is converted into a frame signal. Prior to description of the embodiment in FIG. 8, the V jitter will be explained.

Figure 9:
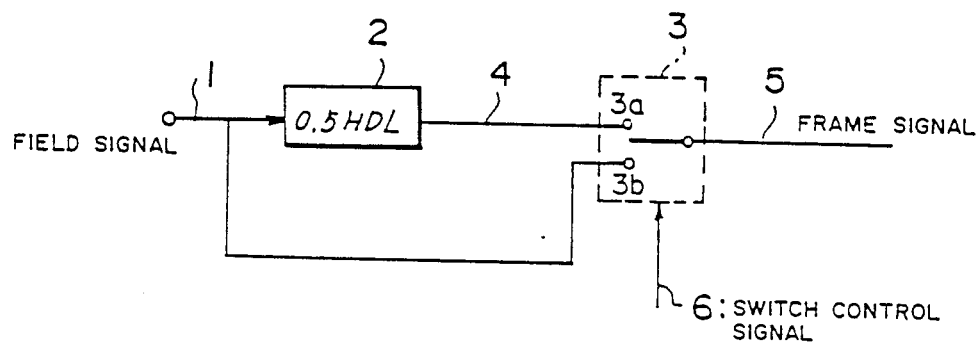
FIG. 9 is a circuit diagram to show a basic structure to realize field/frame conversion.
Figure 10:
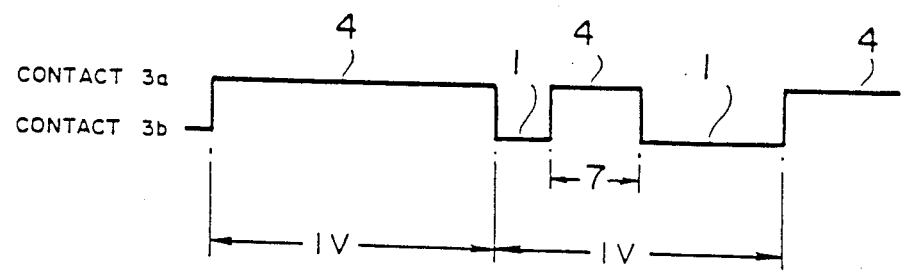
FIG. 10 is a timing chart to show the operation state of a field/frame conversion switch employed in the circuit shown in FIG. 9.

There is employed a so-called field/frame conversion system in which a frame signal is formed of one kind of field signals by using the strong vertical correlation of a video signal as well as by scanning the same recorded portion twice. In this field/frame conversion system, since field signals can not be divided into odd fields and even fields simply by repeating the same field signal, as shown in FIG. 9, the same field signal that has been reproduced repetitively is passed through a 0.5 H delay line 2 so as to provide a non-delay field signal and a 0.5 H delayed field signal by means of a change-over switch 3, and the two types of field signals are selected alternately at every one vertical scan period (1 V) to thereby obtain an odd field and an even field, that is, a field signal 1 is converted to a frame signal 5. However, since the time interval between two successive vertical synchronization signals, as they are, is delayed 0.5 H from 1 V, it is considered that the contacts $3a$, $3b$ of the change-over switch 3 are selected in such a manner as shown in FIG. 10. That is, by use of a switch control signal 6, the 0.5 H delay field signal 4 is selected in a portion 7 ranging from a front equalization pulse section to a back equalization pulse section out of a period to select the non-delay field signal 1. At any rate, in order to convert the field signal to the frame signal, as shown in FIG. 9, there is used a circuit which is adapted to select the non-delay signal and the 0.5 H delay signal.

In this manner, one kind of field signals can be used to form an interlaced-scan frame signal and an image based on such frame signal can be reproduced on a television screen. However, in this case, there is produced a V jitter in the image. The V jitter means the vertical-direction (V direction) displacements of the image that are repeated at a field cycle on the television screen image, each displacement having a width of one horizontal scan line (1 H). That is, in this case, the television screen image is vibrated vertically with 1 H width at a field cycle (1/60 sec.).

As effective means to prevent the occurrence of such V jitter, conventionally, there has been employed a technique to use an arithmetic mean of odd-field brightness signals. That is, a 1 H delay brightness signal is added to a non-delay brightness signal and the sum of them is then divided by 2 to obtain a signal; and, the thus obtained signal is used as an odd-field brightness signal.

Now, referring back to FIG. 8, a magnetic head 110 is connected to the input terminal of the amplifier 111 and the output terminal of the amplifier 111 is connected to the input terminal of a first frequency converter 112, whereby the frequency modulated field signal that is repetitively reproduced by the magnetic head 110 is first amplified by the amplifier 111 and then can be supplied to the first frequency converter 112.

A signal with a given frequency f1 (for example, a frequency of the order of 28 MHz) to be oscillated in a local oscillator 113 is supplied to the first frequency converter 112, where the signal with the frequency f1 and the above-mentioned field signal are mixed together to thereby provide a sum signal and a difference signal thereof.

The above-mentioned field signal is composed of a brightness signal with a frequency bandwidth of fy and a chroma signal with a frequency band width of fc and it has a bandwidth of fc+fy (for example, 0~10 MHz). The first frequency converter 112 is configured as a circuit which is adapted to be able to obtain a signal having a higher-band frequency as the output thereof, that is, it can provide a signal with a frequency of fc+fy+f1 (for example, 28~38 MHz) at the output thereof.

The output terminals of the first frequency converter 112 are connected to the input terminals of a 0.5 H delay line 115 and a second frequency converter 118 as well as to the contact b of a field/frame conversion switch 124 which is used to perform the field/frame conversion of the chroma signals.

Also, the output terminal of the 0.5 H delay line 115 is connected through another 0.5 H delay line 116 to a second frequency converter 117 as well as to the input terminal of another second frequency converter 119 and the contact a of the field/frame conversion switch 124.

A signal with a frequency f1 (28 MHz or so) can be supplied from the local oscillator 113 to the respective second frequency converters 117, 118, and 119.

Here, the 0.5 H delay lines 115 and 116 are respectively glass delay lines each having a wide band frequency characteristic and the frequency characteristic and group delay characteristic thereof are as shown in FIG. 3. As described before, each of the glass delay line has a bandwidth of 16~44 MHz. Since the frequency bandwidth of the output signal of the first frequency converter 112 is 28~38 MHz, when the above-mentioned glass delay line is used, then there can be provided a sufficient bandwidth, so that there arises no problem with respect to the frequency characterisitc of the glass delay line.

Also, with respect to the group delay characteristic of the above-mentioned glass delay line, the range of variations of the delay time in the bandwidth of 16~44 MHz is within 100 n sec. This range of delay time variations produces such slight color discrepancies that can be neglected in practial uses.

Now, the 0.5 H delay line 115 is used to delay only 0.5 H the frequency modulated field signal in the field/frame conversion operation and the other 0.5 H delay line 116 is used 115 to delay the frequency modulated field signal (the output signal of the first frequency converter 112) 1 H with the above-mentioned 0.5 H delay line so as to obtain a field signal which is necessary to perform the arithmetic mean operation of the brightness signals.

The second frequency converters 117, 118 and 119 are respectively adapted to receive the output signals (with a frequency of fc+fy+f1, for example, 28~38 MHz) of the first frequency converter 112 through the 0.5 H delay lines 115 and 116, or directly from the first frequency converter 112, or through only the 0.5 H delay line 115, and to mix these signals with the output signals of the first local oscillator 113 so as to provide the difference signals (with a frequency of fc+fy) thereof. The output terminals of the second frequency converters 117 and 118 are respectively connected to high-pass filters 122 and brightness signal process circuit 123 and further to a addition circuit 120 which is adapted to calculate the arithmetic mean of these output signals Also, the output terminal of the addition circuit 120 is connected to a contact a of a field/frame conversion switch 121 and the other contact b of the switch 121 is connected through another brightness signal process circuit 123 and high-pass filter 122 to the output terminal of the second frequency converter 119. The field/frame conversion switch 121 is composed of an analog switch which is adapted to select alternately a field signal 100 output from the addition circuit 120 and a field signal output from the second frequency converter 119 at every one vertical scan period (1 V) according to a control signal 102 to thereby convert them into a frame signal 104.

To the output terminals of the second frequency converters 117 to 119 there are connected the high-pass filters (with a frequency of fy, for example, 2.5~10 MHz) and the brightness signal process circuits 123, so that a brightness signal Y can be reproduced through these high-pass filters 122 and brightness signal process circuit 123. Here, each of the brightness signal process circuit 123 is composed of a frequency modulated signal demodulator, a de-emphasis circuit and the like and is used to create the brightness signal Y.

On the other hand, the field/frame conversion switch 124 is a switch which is used to carry out the field/frame conversion operation on the chroma signals. The contact a of the switch 124 is connected via the second frequency converter 126 to the output terminal of the 0.5 H delay line 115, and the contact b thereof is connected to the output terminal of the amplifier 111. The field/frame conversion switch 124 selects a field signal 132 that is delayed 0.5 H and output through the second frequency converter 126 from the 0.5 H delay line 115 and a non-delay field signal 107 alternately at every one vertical scan period according to a control signal 106 so as to obtain a frame signal 108.

The above-mentioned second frequency converter 126 is a circuit which is adapted to receive a signal with a frequency of f1 oscillated from the local oscillator 113 and mix it with the above-mentioned chroma signal component (with a frequency fc+f1) to thereby obtain the difference therebetween, that is, provide the original chroma signal component with a frequency fc. The original chroma signal component fc is then input to a chroma signal process circuit 128 where line sequentialized color difference signals R−Y, B−Y are created. The color difference signals R−Y, B−Y are then output to an NTSC encoder 129 which is adpated to mix the color difference signals R−Y, B−Y with the brightness signals Y output from the brightness signal process circuits 123 to thereby create a given format of NTSC composite signal.

Now, we will describe the operation of the circuits in the reproducing system of the magnetic recording/reproducing apparatus constructed in the above-mentioned manner.

The field signal with a frequency bandwidth of fc+fy that is repeatedly reproduced by the magnetic head 110 is first amplified by the amplifier 111 and is then supplied to the first frequency converter 112. The field signal supplied to the first frequency converter 112 is mixed with the signal with a frequency of f1 output from the local oscillator 113 to provide the sum signal component of a higher frequency band (with a frequency of fc+fy+f1) which is in turn output from the first frequency converter 112. The output signals of the first frequency converter 112 are súpplied to the 0.5 H delay line 115 and the second frequency converter 118, respectively. As a result of this, the field signal that is delayed 1 H by 0.5 H delay lines 115, 116 is input to the frequency converter 117, the non-delay field signal is input to the second frequency conver 118, and the field signal that is delayed only 0.5 H is input to the second frequency converter 119. These field signals are then converted by the second frequency converters 117, 118, and 119 into the field signal with a frequency bandwidth of fc+fy. And, the field signals that are output from the second frequency converters 117 and 118 are respectively input via the high-pass filters 122 and brightness signal process circuit 123 to the addition circuit 120, and in the addition circuit 120 these signals are processed to obtain a signal 100 representing the arithmetic mean thereof, which signal is then supplied to the contact a of the field/frame conversion switch 121.

On the other hand, to the other contact b of the field/frame conversion switch 121 is input a field signal 101 that is delayed only 0.5 H through the second frequency converter 119, high-pass filter 122 and brightness signal process circuit 123. These field signals 100, 101 are selected alternately at every one vertical scan period according to the control signal 102 to be converted into a frame signal 104. In the brightness signal process circuit 123, the brightness signal component input thereto is demodulated and is then de-emphasized so as to create the brightness signal Y. The thus created brightness signal Y is then input to the NTSC encoder 129.

Also, a non-delay field signal 107 output from the amplifier 111 and a field signal 132 that is delayed only 0.5 H and is obtained via the first frequency converter 112, 0.5 H delay line 115 and second frequency converter 126 are selected alternately at every one vertical scan period by the field/frame conversion switch 124 according to a control signal 106 to be converted into a frame signal 108, so that the two line sequentialized color difference signals R−Y, B−Y can be created. The two color difference signals are output to the NTSC encoder 129 and in the NTSC encoder 129 these two color difference signals R−Y, B−Y are mixed with the brightness signals Y output from the brightness signal process circuits 123 to thereby create the NTSC composite signal, which is then output therefrom.

As described above, in the present embodiment, the frequency modulated field signal is once converted into the field signal with a higher band of frequencies and the higher frequency field signal is then delayed only 0.5 H by use of the 0.5 H glass delay line which has a wide band frequency characteristic and also has a good group delay characteristic, before the frame signal is created. Therefore, according to the present embodiment, there is produced almost no difference in delay time between the brightness and chroma signals, which eliminates the possibility of the color discrepancies being generated in the reproduced image.

Also, the 0.5 H glass delay line used in the present embodiment has a wider signal band over the conventional CCD (charge coupled device), which can reduce the signal degradation, that is, a better S/N (signal-to-noise ratio) can be obtained. For this reason, according the present embodiment, it is possible to obtain a frame signal which is excellent in S/N.

Further, according to the present embodiment, since the field signal, with the brightness signal component and chroma signal component thereof remaining mixed together, can be converted into the frame signal, a circuit configuration can be simplified.

Moreover, in the present embodiment, due to the fact that the field signal can be converted, in the frequency modulated state, into the frame signal, there is eliminated the possibility that flickers may be produced by the switching operation of the field/frame conversion switch.

In addition, according to the present embodiment, since the arithmetic mean is employed in the field/frame conversion of the brightness signals, it is possible to prevent the occurrence of the V jitter and a shade of the reproduce image can occur continuously.

Figure 11:
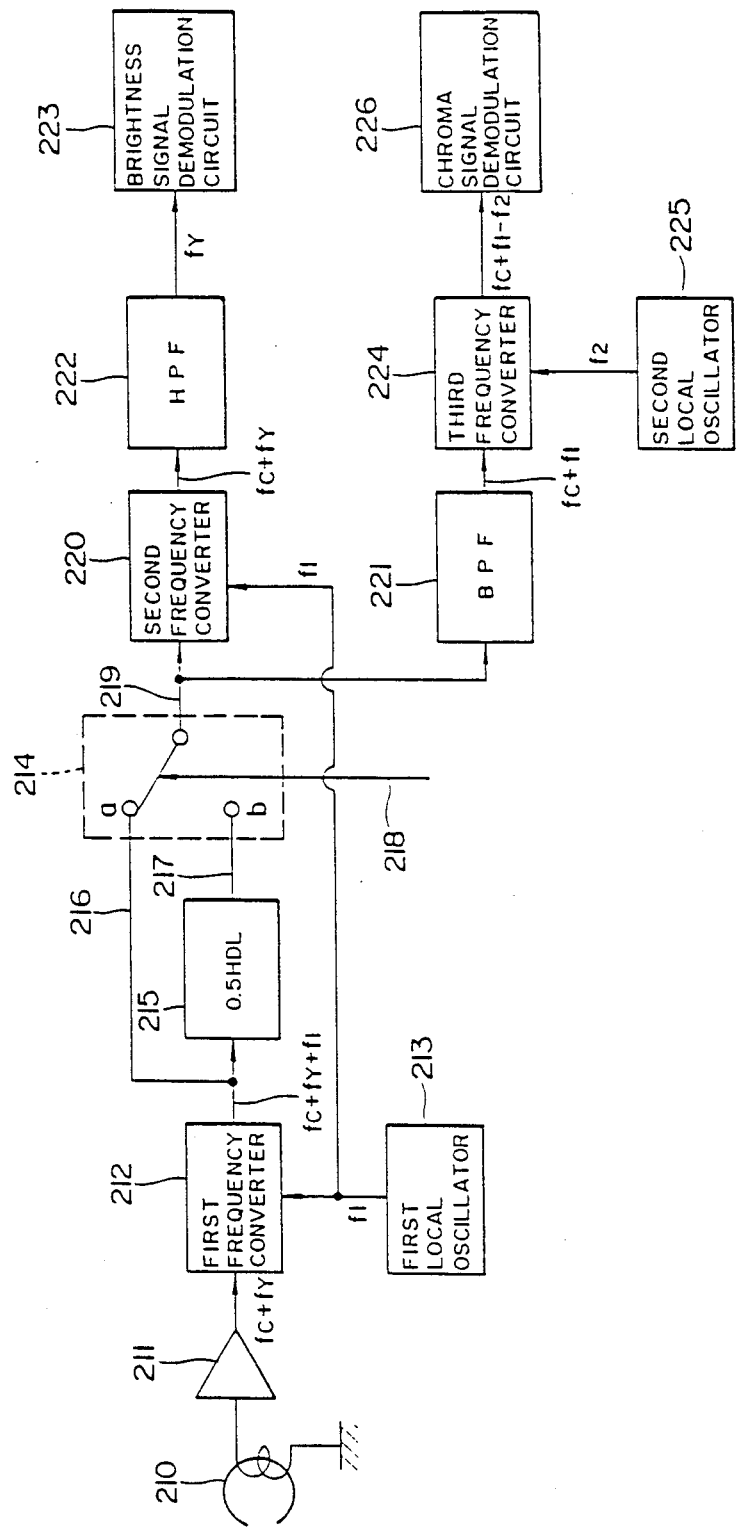
FIG. 11 is a block diagram of a still further embodiment of a reproducing system in a magnetic recording/reproducing apparatus to which the invention is applied.

Referring now to FIG. 11, there is shown a further embodiment of a reproducing system in a magnetic recording/reproducing apparatus to which the invention is applied. In FIG. 11, a magnetic head 210 is connected to the input terminal of an amplifier 211 and the output terminal of the amplifier 211 is connected to the input terminal of a first frequency converter 212, whereby a field signal that is repetitively reproduced by the magnetic head 210 is first amplified by the amplifier 211 and is then supplied to the first frequency converter 212. To the first frequency converter 212 there can be supplied a signal with a given frequency of f1 (for example, 28 MHz or so) which is oscillated in a first local oscillator 213 and, in the first frequency converter 212, the signal with a frequency of f1 is mixed with the above-mentioned field signal so as to be able to obtain a sum signal and a difference signal thereof. The above-mentioned field signal is composed of a brightness signal with a frequency bandwidth of fy and a chroma signal with a frequency bandwidth of fc, and thus the field signal has a bandwidth of fc+fy (for example, 0~10 MHz). The first frequency converter 212 is a circuit which is adapted to be able to obtain as the output terminal thereof a signal having a frequency in the higher frequency band, that is, at the output thereof there can be obtained a signal which has a frequency of fc+fy+f1 (for example, 28~38 MHz). The output terminal of the first frequency converter 212 is connected to one contact a of a field/frame conversion switch 214 and it is also connected to the other contact b of the field/frame conversion switch 214 through a 0.5 H delay line 215 which may be composed of a glass delay line or the like having a wide band frequency characteristic, whereby the output signal (with a frequency of fc+fy+f1) of the first frequency converter 212 can be applied intact to the one contact a of the field/frame conversion switch 214 as well as it can also be applied through the 0.5 H delay line 215 to the other contact b of the switch 214. The field/frame conversion switch 214 is composed of an analog switch which is adapted to select a non-delay field signal 216 and a field signal 217 through the 0.5 H delay line 215 alternately at every one vertical scan period (1 V) according to a control signal 218 to thereby convert into a frame signal 219. The output terminal of the field/frame conversion switch 214 is connected to a second frequency converter 220 and a band-pass filter 221, so that the frame signal 219 output from the switch 214 can be supplied to the second frequency converter 220 and band-pass filter 221.

The second frequency converter 220 is a circuit which is adapted to receive the signal with an oscillation frequency of f1 output from the first local oscillator 213 and to mix it with the frame signal (with a frequency of fc+fy+f1) so as to provide a difference signal (with a frequency of fc+fy) thereof. The output terminal of the second frequency converter 220 is connected through a high-pass filter 222 to a brightness signal demodulation circuit 223, so that the output signal (with a frequency of fc+fy, for example 0~10 MHz) from the second frequency converter 220, after it passes through the high-pass filter 222 and thus it becomes a brightness signal component (with a frequency of fy, for example, 2.5~10 MHz), can be demodulated by the brightness signal demodulation circuit 223 into a brightness signal Y.

The band-pass filter 221 is a filter with a given bandwidth (for example, 28±2.5 MHz) which is adapted to be able to take the chroma signal component (with a frequency of fc+f1, for example, 28~30.5 MHz) out of the frame signal 219 and supply it to a third frequency converter 224. The third frequency converter 224 is a circuit which is adapted to be able to receive a signal with a local frequency of f2 (for example, 24 MHz) that is oscillated by a second local oscillator 225 and mix it with the above-mentioned chroma signal component (with a frequency of fc+f1) to thereby provide a difference component (with a frequency of fc+f1−f2, for example, 4~6.5 MHz) thereof. The output signal (chroma signal component) from the third frequency converter 224 is applied to a chroma signal demodulation circuit 226 in which a chroma signal can be obtained.

We will describe the operation of the above-constructed embodiment.

The field signal with a frequency bandwidth of fc+fy that is repetitively reproduced by the magnetic head 210 is first amplified by the amplifier 211 and is then supplied to the first frequency converter 212. The field signal supplied to the first frequency converter 212 is mixed with the signal with a frequency of f1 output from the first local oscillator 213 to provide a sum signal component (with a frequency of fc+fy+f1) which is then output from the first frequency converter 212. The signal output from the first frequency converter 212 is divided into two signals: that is, one is a signal 216 which is supplied intact to the one contact a of the field/frame conversion switch 214; and, the other is a signal 217 which is passed through the 0.5 H delay line 215 and is then supplied to the other contact b of the switch 214. These two kinds of signals are selected alternately at every 1 V by the switch 214 to be converted into the frame signal 219 and the thus created frame signal 219 is then supplied to the second frequency converter 220 and band-pass filter 221.

The frame signal 219 that is supplied to the second frequency converter 220 is mixed here with the signal output from the first local oscillator 213 to be converted again to the signal with a low frequency of fc+fy. When the signal with this frequency of fc+fy is passed through the high-pass filter 222, then there can be obtained only the brightness signal component (fy). And, the brightness signal component (fy) is applied to the brightness signal demodulation circuit 223 to therey provide the brightness signal Y.

On the other hand, the frame signal that has passed through the band-pass filter 221 provides the chroma signal component with a given bandwidth of fc+f1, which is in turn supplied to the third frequency converter 224. The chroma signal component thus supplied to the third frequency converter 224 is mixed with the signal output from the second local oscillator 225. In the third frequency converter 224, the difference component thereof is taken out. The difference component is selected so as to have a frequency that is ideal for the chroma signal demodulation circuit 226 to demodulate the difference component.

As mentioned above, according to the present embodiment, since the field signal, while the brightness signal component and chroma signal component thereof are maintained in the frequency multiplexed condition, can be converted to the frame signal, a simplified circuit configuration is possible. Also, due to the fact that the chroma signal component can be demodulated at a frequency which is suitable for chroma demodulation, the chroma reproduction can be improved.

Further, according to the present embodiment, since the brightness and chroma signals are respectively delayed 0.5 H in the frquency modulated conditions thereof before they are demodulated, it is possible to prevent the occurrence of flickers.

Figure 12:
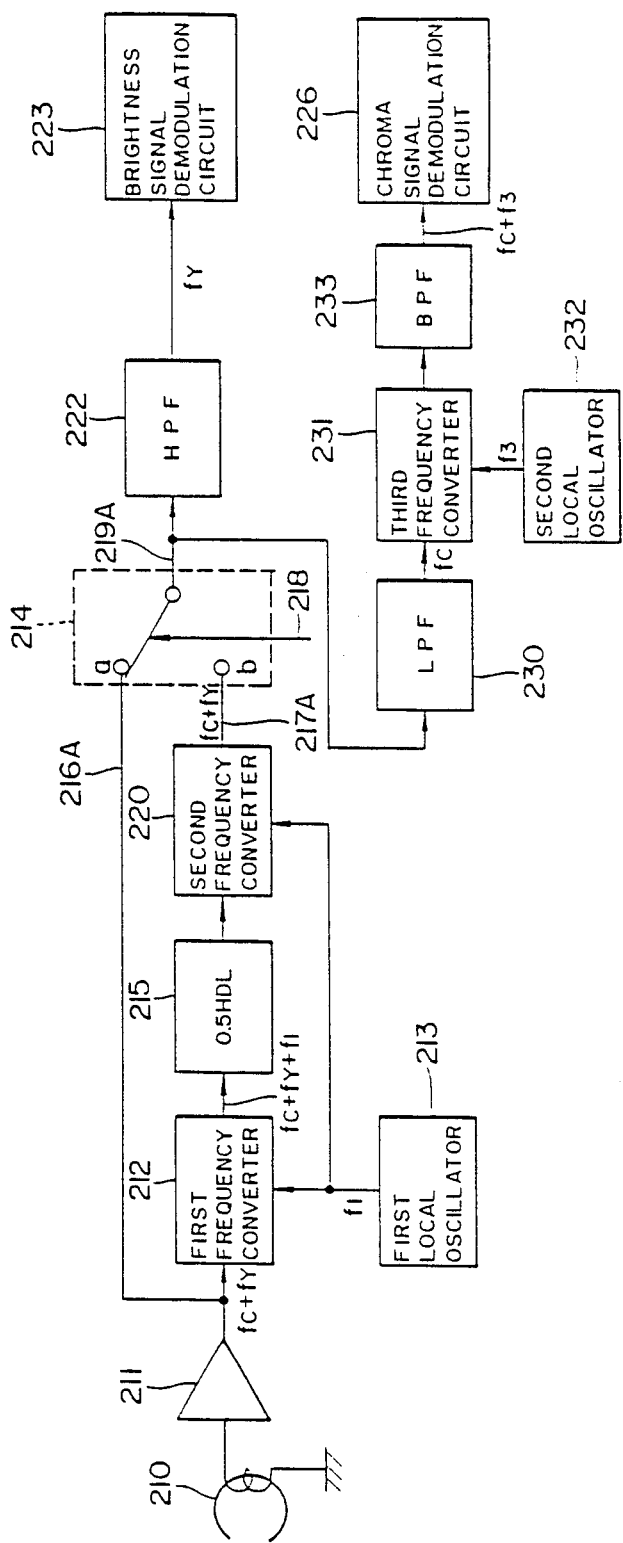
FIG. 12 is a block diagram of a yet further embodiment of a reproducing system in a magnetic recording/reproducing apparatus to which the invention is applied.
Figure 113:
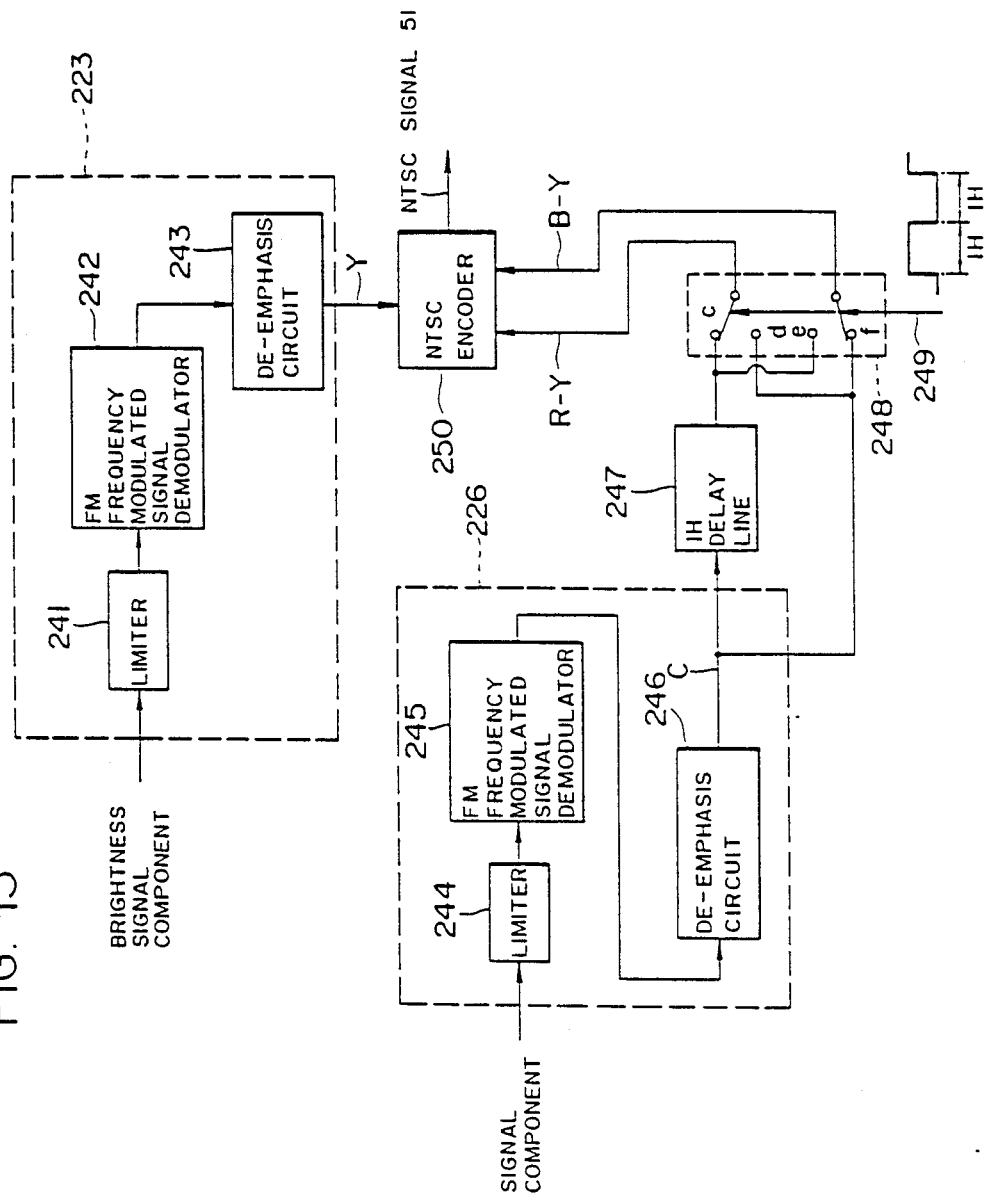

Referring next to FIG. 12, there is shown another embodiment of a reproducing system in a magnetic recording/reproducing apparatus to which the invention is applied. In this embodiment as well, the same parts as in the last-mentioned embodiment are given the same designations for convenience of description thereof.

The embodiment shown in FIG. 12 is different from the last-mentioned embodiment in connection with FIG. 11 in that the field/frame conversion is performed in a lower frequency (for example, 0~10 MHz), but the present embodiment is similar to the last-mentioned embodiment in the subject matter thereof, that is, they are similar to each other in that the 0.5 H delay is carried out at a higher frequency and that the chroma signal demodulation is performed at an optimum frequency. In other words, according to the present embodiment, there is provided a circuit configuration in which a field signal with a frequency of fc+fy that is repetitively reproduced by the magnetic head 210 is first amplified by the amplifier 211 and is then divided into two signals: one of them is a signal 216A which is supplied intact to the one contact a of the field/frame conversion switch 214; and, the other is a signal 217A which is once converted to a field signal with a high frequency of fc+fy+f1 (for, example, 28~38 MHz), is next delayed 0.5 H by the 0.5 H delay line 215 and is then converted back again to the field signal with the original frequency (fc+fy, for example, 0~10 MHz) by the second frequency converter 220 before it is supplied to the other contact b of the conversion switch 214. The conversion switch 214 is a switch which is adpated to select the above-mentioned respective signals 216A and 217A alternately at every 1 V in accordance with the control signal 218 to obtain a frame signal 219A. The frame signal 219A output from the switch 214 is to be input to the high-pass filter 222 and low-pass filter 230.

The output of the high-pass filter 222 is to be supplied to the brightness signal demodulation circuit 223.

The low pass filter 230 is a circuit which is adapted to transmit therethrough only the chroma signal component with a frequency of fc (for example, 0~2.5 MHz) out of the frame signal 219A. The output terminal of the low-pass filter 230 is connected to a frequency converter 231, so that the above-mentioned chroma signal component can be supplied to the frequency converter 231. A signal with a given frequency of f3 (for example, 4 MHz) that is oscillated by a local oscillator 232 can be supplied to the frequency converter 231. In the frequency converter 231, the chroma signal component and the signal from the local oscillator 232 are mixed together to thereby provide a sum signal component and a a difference signal component therof. The output terminal of the frequency converter 231 is connected through a band-pass filter 233 to the chroma signal demodulation circuit 226, so that the output signal from the frequency converter 231 can be filtered by the band-pass filter 233 with a given bandwidth of fc+f3 (4~6.5 MHz) before it can be supplied to the chroma signal demodulation circuit 226.

Now, the operation of the thus structured embodiment will be described below.

The field signal that is repetitively reproduced by the magnetic head 210 is first amplified by the amplifier 211 and is then applied to the one contact a of the above-mentioned switch 214 and at the same time supplied to the first frequency converter 212. The field signal that is given to the first frequency converter 212 is once converted to a field signal with a high frequency of fc+fy+f2 and is then supplied to the 0.5 H delay line 215. The high frequency field signal is delayed 0.5 H by the 0.5 H delay line 215 and the 0.5 H delayed field signal is again converted to the signal with a low frequency of fc+fy by the second frequency converter 220, before it is applied to the other contact b of the switch 214. The signal 216A applied to the one contact a of the switch 214 and the signal 217A applied to the other contact b of the switch 214 are selected alternately at every 1 V to the converted to the frame signal 219A.

The frame signal 219A is given through the high-pass filter 222 to the brightness signal demodulation circuit 223 to provide the brightness signal Y.

Also, when the frame signal 219A is passed through the low-pass filter 230, then only the chroma signal component (fc) thereof is extracted. The chroma signal component (fc) is mixed with the signal with a frequency (f3) output from the local oscillator 232 in the frequency converter 231 and the sum component (fc+f3) thereof is taken out through the band-pass filter 233 and is then applied to the chroma signal demodulation circuit 226 so as to obtain the chroma signal C.

According to the present embodiment, in addition to the effects of the above-mentioned embodiment, since the switching operation to perform the field/frame conversion can be carried out in the low frequency, there is obtained an effect that it is easy to configure a circuit.

Referring now to FIG. 13, there is shown a block diagram of an embodiment of the above-mentioned demodulation circuits 223, 226.

The brightness signal component (fy) that has been converted to the frame signal is passed through a limiter 241, is demodulated by a frequency modulated signal demodulator 242, and is passed through a de-emphasis circuit 243 having a characteristic corresponding to a pre-emphasis characteristic given when a signal is recorded, with the result that the brightness signal component can provide a brightness signal Y of a base band. Also, the line sequential chroma signal (fc+ f1−f2) converted to the frame signal is passed through a limiter 244, is demodulated by a frequency modulated signal demodulator 245, and is then passed through a de-emphasis circuit 246 having a characteristic corresponding to the pre-emphasis characteristic given during recording so as to provide a line sequential color difference signal C of a base band. The line sequential color difference signal C is separated by a 1 H delay line 248 and a synchronizing switch 248 into two color difference signals R−Y, B−Y. The synchronizing switch 248 is adapted such that the selection of the contacts c and f thereof and the selection of the contacts d and e can be executed at every 1 H according to a control signal 249. As a result of this, the portions of the respective color difference signals that have been omitted at every 1 H in recording can be supplemented by the signals of 1 H before, so that the continuous R−Y, B−Y color difference signals can be obtained.

The brightness signal Y and two color difference signals R−Y, B−Y of a base band obtained in the above-mentioned manner are converted by an encoder 250 to NTSC signal 251, as occasion demands, which are given to a television receiver, a monitor television receiver and the like.

Figure 14:
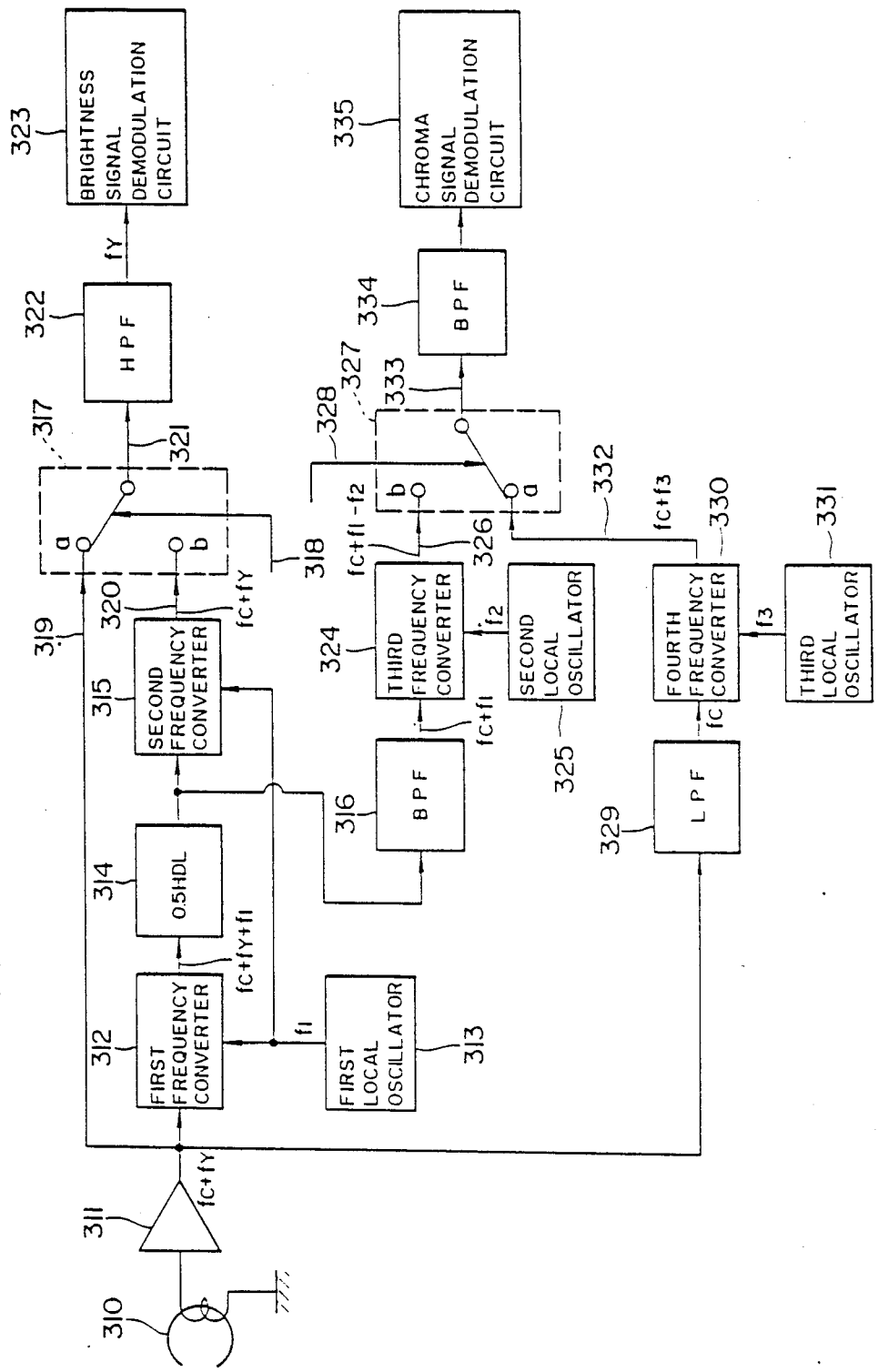
FIG. 14 is a block diagram of another embodiment of a reproducing system in a magnetic recording/reproducing apparatus to which the invention is applied; and, FIG. 15 is a block diagram of a further embodiment of a reproducing system in a magnetic recording/reproducing apparatus to which the invention is applied.

Referring next to FIG. 14, there is shown a further embodiment of a reproducing system in a magnetic recording/reproducing apparatus to which the invention is applied.

In FIG. 14, a magnetic head 310 is connected to the input terminal of an amplifier 311 and the output terminal of the amplifier 311 is connected to the input terminal of a first frequency converter 312, whereby the field signal that is reproduced by the magnetic head 310 can be amplified by the amplifier 311 and also can be then supplied to the first frequency converter 312. To the first frequency converter 312 is supplied a signal with a given frequency of f1 (for example, 28 MHz) that is oscillated in a first local oscillator 313. The first frequency converter 312 is a circuit which is adapted to mix a signal with a frequency of fc+fy (for example, 0~10 MHz), which is composed of a brightness signal with a frequency of fy (for example, 2.5~10 MHz) and a chroma signal with a frequency of fc (for example, 0.5~2.5 MHz), with the signal with a frequency of f1 from the local oscillator 313 so as to obtain a sum signal thereof with a frequency of fc+fy+f1 (for example, 28~38 MHz). The output terminal of the first frequency converter 312 is connected through a 0.5 H delay line 314 (for example, a glass delay line) having a wide band frequency characteristic to a second frequency converter 315 and a band-pass filter 316 having a pass band of fc+f1, whereby the signal with a frequency of fc+fy+f1 from the first frequency converter 312 can be delayed 0.5 H by the delay line 314 and then can be supplied to the second frequency converter 315 and band-pass filter 316. As can be seen from the foregoing description, since the delay line 314 is used at the high frequency, there can be obtained a sufficient frequency bandwidth. Now, the output terminal of the second frequency converter 315 is connected to one contact b of a field/frame conversion switch 317. The second frequency converter 315 is a circuit which is adapted to mix the local oscillation signal with a frequency of f1 from the first local oscillator 313 with the signal with a frequency of fc+fy+f1 from the 0.5 H delay line 314 and also to supply a difference signal thereof with a frequency of fc+fy+f1−f1 to the one contact b of the switch 317.

The other contact a of the switch 317 is connected to the output terminal of the amplifier 311, whereby a non-delay field signal with a frequency of fc+fy from the amplifier 311 can be supplied to contact a. The switch 317 is composed of an analog switch which is adapted to select the non-delay field signal 319 and the 0.5 H delayed field signal 320 alternately at every one vertical scan period (1 V) in accordance with a control signal 318 to convert into a frame signal 321 and also to supply the frame signal 321 to a high-pass filter 322. This high-pass filter 322 is a circuit which transmits therethrough only the brightness signal with a frequency of fy out of the frame signal with a frequency of fc+fy and also supplies the brightness signal to a brightness signal demodulation circuit 323. The brightness signal demodulation circuit 323 is a circuit adapted to demodulate the above-mentioned brightness signal.

On the other hand, the band-pass filter 316 is a circuit which is adapted to select the signal with a frequency of fc+f1 (for example, 28~30.5 MHz) out of the 0.5 H delayed field signal with a frequency of fc+fy+f1 and also to supply it to a third frequency converter 324. A second local oscillator 325 is connected to the third frequency converter 324, so that an oscillation signal with a frequency of f2 (for example, 24 MHz) that is oscillated in the second local oscillator 325 can be supplied to the third frequency converter 324. The third frequency converter 324 a circuit which is adapted to mix a signal with a frequency of fc+f1 from the band-pass filter 316 with the oscillation signal with a frequency of f2, to thereby provide a difference signal 326 thereof with a frequency of fc+f1−f2 (for example, 4~6.5 MHz) and also to supply the difference signal 326 to one contact b of a field/frame conversion switch 327. This switch 327 is composed of an analog switch which is adapted to select the signals at the two contacts a, b alternately at every one vertical scan period (1 V) according to a control signal 328 to convert them into the frame signal.

The output terminal of the amplifier 311 is connected through a low-pass filter 329 to the input terminal of a fourth frequency converter 330, so that the low-pass filter 329 can extract only the component fc out of the field signal with frequency of fc+fy and also can supply it to the fourth frequency converter 330. To the fourth frequency converter 330 is connected a third local oscillator 331, so that an oscillation signal with a local oscillation frequency of f3 (for example, 4 MHz) can be applied to the fourth frequency converter 330. This fourth frequency converter 330 is a circuit which is adapted to mix the non-delay field signal with a frequency of fc input thereto with the oscillation signal with a frequency of f3 output from the third local oscillator 331 to thereby obtain a sum signal thereof having a frequency of fc+f3 (for example, 4~6.5 MHz) 332 and also to supply the sum signal to the other contact b of the switch 327.

The above-mentioned switch 327 is a switch which is adapted to select a 0.5 H delayed signal 326 and a non-delay signal 332 alternately at every 1 H to convert them into a frame signal 333 with a frequency of $fc+f1-f2=fc+f3$ (for example, 4~6.5 MHz and also to supply the frame signal 333 to a band-pass filter 334. The band-pass filter 334 is a circuit which transmits the frame signal therethrough and also supplies it to a chroma signal demodulation circuit 335 adapted to demodulate the frame signal into a chroma signal.

Next, the operation of the present embodiment will be described below.

The signal with a frequency of fc+fy (0~10 MHz) that is repetitively reproduced by the magnetic head 310 is first amplified by the amplifier 311 and, after then, is supplied to the first frequency converter 312 and low-pass filter 329 as well as supplied to the contact a of the switch 317 as the non-delay field signal 319. The signal with a frequency of fc+fy that is supplied to the first frequency converter 312 is mixed here with the oscillation signal with a frequency of f1 output from the first local oscillator 313. When the sum signal with a frequency of fc+fy+f1 out of the mixed signal is passed through the 0.5 H delay line 314, then it provides the 0.5 H delayed signal. The thus delayed signal is then supplied to the second frequency converter 315 and bandpass filter 316. The signal with a frequency of fc+fy+f1 that is supplied to the second frequency converter 315 is mixed here with the oscillation signal with a frequency of f1 output from the first local oscillator 313. Only the difference signal with a frequency of signal is taken out $fc+fy+f1-f1=fc+fy$ of the thus mixed by the second frequency converter 315 and it is then supplied to the contact b of the switch 317 as the 0.5 H delayed signal.

The signals respectively supplied to the two contacts a, b of the switch 317 are selected alternately at every 1 V according to the control signal 318 to be converted into the frame signal 321, and the frame signal 321 is then supplied to the high-pass filter 322. The high-pass filter 322 takes out only the brightness signal component (fy) of the frame signal supplied thereto and also supplies it to the brightness signal demodulation circuit 323. In this manner, the brightness signal Y can be obtained.

On the other hand, after the signal with a frequency of fc+fy supplied to the low-pass filter 329 has passed through the low-pass filter 329, it becomes only the chroma signal component with a frequency of fc. The chroma signal component with a frequency of fc is then supplied to the fourth frequency converter 330. In the fourth frequency converter 330, the chroma signal component with a frequency of fc is mixed with the oscillation signal with a frequency of f3 output from the third local oscillator 331. Only the sum component with a frequency of fc+f3 (4~6.5 MHz) of the mixed signal is taken out by the fourth frequency converter 330 and is then supplied as a non-delay signal 332 to the contact a of the field/frame conversion switch 327.

Also, the signal that is delayed by the 0.5 H delay line 314 is transformed by the band-pass filter 316 into a signal with a frequency of fc+f1 exclusive of the brightness signal component thereof, and is then supplied to the third frequency converter 324. The signal thus supplied to the third frequency converter 324 is mixed there with the oscillation signal with a frequency of f2 output from the second local oscillator 325. The difference component with a frequency of fc+f1−f2 (4~6.5 MHz) of the signals mixed in the third frequency converter 324 is then extracted and is then supplied as the delayed field signal 326 to the contact b of the field/frame conversion switch 327.

The respective signals supplied to the contacts a, b of the switch 327 are selected alternately at every 1 V according to the control signal 328 and are then supplied as the frame signals 333 to the band-pass filter 334. Having passed through the band-pass filter 334, the field signal is transformed into the chroma signal component with a frequency of $fc+f1-f2=fc+f3$ (4~6.5 MHz) and the chroma signal component is then applied to the chroma signal demodulation circuit 335 in which the chroma signal can be obtained.

According to the present embodiment, the switching operation for the field/frame conversion can be performed at the low frequencies and, at the same time, the chroma demodulation can be executed in the best characteristic portion of the demodulator.

Also, according to the present embodiment, since the 0.5 H time delay of the brightness and chroma signals is carried out in the frequency modulated states thereof before the brightness and chroma signals are demodulated, it is possible to prevent the occurrence of flickers.

Figure 15:
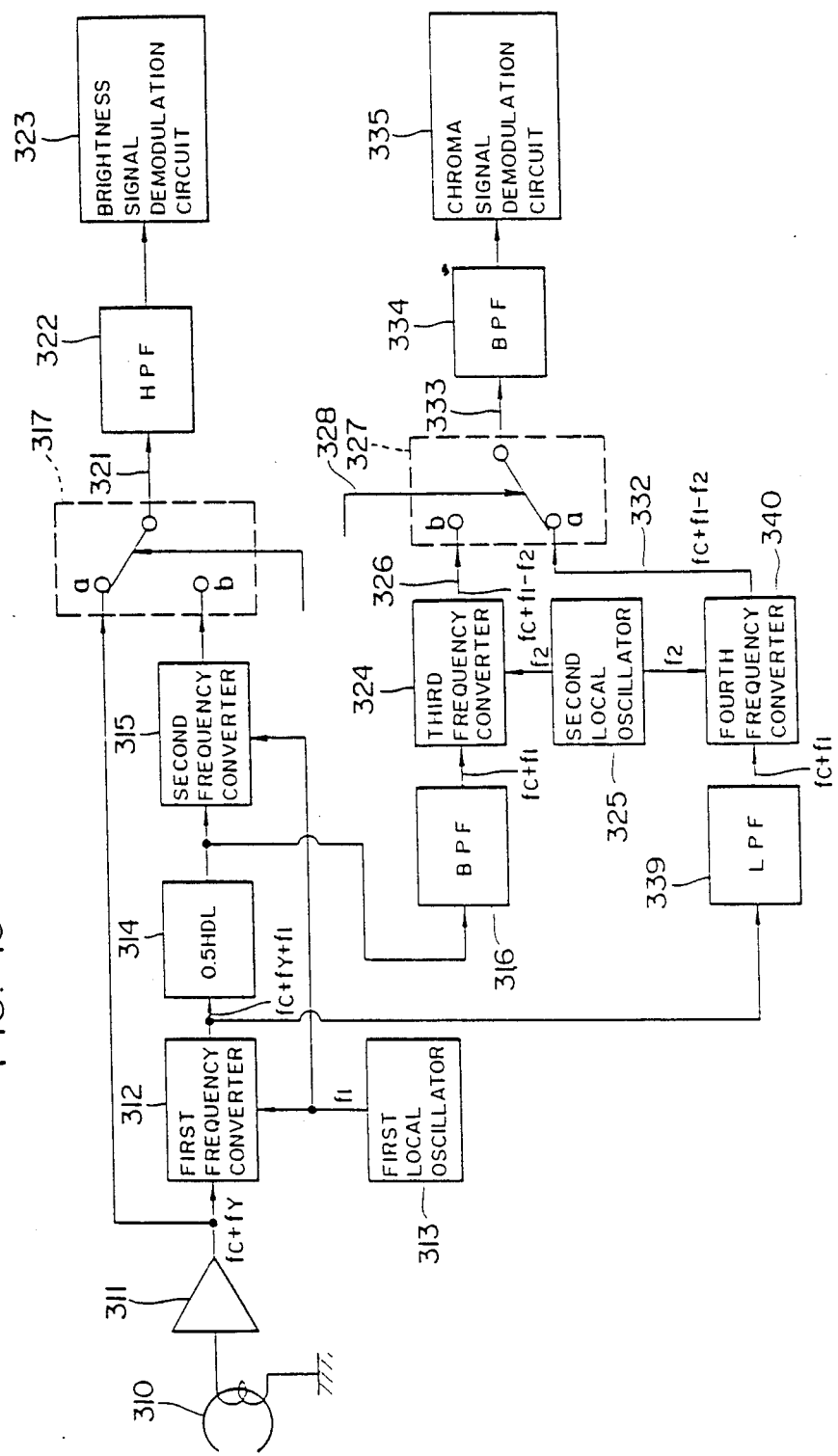

Finally, referring to FIG. 15, there is shown a still further embodiment of a reproducing system in a magnetic recording/reproducing apparatus to which the invention is applied.

The present embodiment is substantially similar to the embodiment shown in FIG. 14, but it is different from the latter only in that a field signal with a frequency of fc+fy+f1 (for example, 28~38 MHz) output from the first frequency converter 312 is supplied through a band-pass filter 339 with a pass bandwidth of fc+f1 (for example, 28~10.5 MHz) to a fourth frequency converter 340, the field signal is mixed with an oscillation signal with an oscillation frequency of f2 (for example, 24 MHz) from the second local oscillator 325 in the fourth frequency converter 340, the difference component thereof with a frequency of fc+f1−f2 (for example, 4~6.5 MHz) is taken out, and the difference component is supplied to the contact a of the field/frame conversion switch 327.

The operation of the present embodiment is substantially the same with the operation of the above-mentioned embodiment shown in FIG. 14, except that the operation of a circuit to obtain a non-delay signal is different to some extent. In other words, in the circuit shown in FIG. 14, with regard to the non-delay signal, the signal with a given bandwidth of fc is taken out from the signal output from the amplifier 311 by the low-pass filter 329, and the signal with a given bandwidth of fc is converted in frequency by the fourth frequency converter 330 so that the frequency bandwidth of the signal (fc) can coincide with that of the delay signal with a frequency of fc+fr−f2. On the other hand, in the embodiment in FIG. 15, the signal that is converted once into a high frequency by the first frequency converter 312 is employed as the non-delay signal and, therefore, in order to carry out the frequency conversion, the oscillation signal with a frequency of f2 output from the second local oscillator 325 can be used, which eliminates the need of one of the local oscillators and also allows the frequency adjustment to be simplified.

It should be noted here that the above-mentioned demodulation circuits 323, 335 are completely identical in structure with the demodulation circuits shown in FIG. 13 and thus the description thereof is omitted here.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A field/frame conversion circuit comprising:

first frequency conversion means adapted to convert the frequency of a repetitively input, frequency modulated field signal on the higher band side than the frequency band of said field signal;

signal delay means adapted to delay a frequency modulated field signal output from said first frequency conversion means only by 0.5 horizontal scan period;

a filter adapted to extract the upper band component of a frequency modulated field signal output from said signal delay means;

second frequency conversion means adapted to convert the frequency of a signal output from said filter to the same frequency of said repetitively input frequency modulated field signal; and, signal switching means adapted to select a frequency modulated field signal output from said second frequency conversion means and delayed only 0.5 horizontal scan period and said repetitively input, frequency modulated field signal not delayed alternately at every one vertical scan period to thereby output a frame signal.

2. A field/frame conversion curcuit as set forth in claim 1, wherein said repetitively input frequency modulated field signal is composed of a brightness signal and a chroma signal the frequencies of which are multiplexed.

3. A field/frame conversion circuit as set forth in claim 2, wherein said signal delay means is a glass delay line having a wide band frequency characteristic.

4. A field/frame conversion circuit in which a signal, which is the arithmetic mean of a repetitively input frequency modulated field signal and a signal obtained by delaying said field signal only one horizontal scan period, and a signal obtained by delaying said frequency modulated field signal only 0.5 horizontal scan period are selected alternately at every one vertical scan period by signal switching means so as to provide a frame signal, characterized in that, in the preceding stage of signal delay means to delay said frequency modulated field signal by the above-mentioned one horizontal scan period and 0.5 horizontal scan period, there is provided frequency conversion means adapted to convert the frequency of said field signal on the higher band side than the frequency of said field signal.

5. A field/frame conversion circuit as set forth in claim 4, wherein said repetitively input frequency modulated field signal is composed of a brightness signal and a chroma signal the frequencies of which are multiplexed.

6. A field/frame conversion circuit as set forth in claim 5, wherein said signal delay means is a glass delay line having a wide band frequency characteristic.

7. A field/frame conversion circuit comprising:
first frequency conversion means adapted to convert the frequency of a repetitively input frequency modulated field signal composed of frequency-multiplexed brightness and chroma signals on the higher band side than the frequency band of said field signal;
signal delay means adapted to delay a frequency modulated field signal output from said first frequency conversion means only by 0.5 horizontal scan period;
signal switching means adapted to select a frequency modulated field signal output from said signal delay means and an undelayed frequency modulated field signal output from said first frequency conversion means alternately at every one vertical scan period to thereby output a frame signal;
a filter adapted to extract a chroma signal component out of said frame signal output from said signal switching means; and,
second frequency conversion means adapted to convert the frequency of a signal output from said filter into a given frequency band in which a good demodulation characteristic can be obtained.

8. A field/frame conversion circuit as set forth in claim 7 wherein said signal delay means is a glass delay line having a wide band frequency characteristic.

9. A field/frame conversion circuit comprising:
first frequency conversion means adapted to convert the frequency of said repetitively input frequency modulated field signal composed of frequency multiplexed brightness and chroma signals on the higher band side than the frequency band of said field signal;
signal delay means adapted to delay a frequency modulated field signal output from said first frequency conversion means only by 0.5 horizontal scan period;
second frequency conversion means adapted to convert the frequency of a signal output from said signal delay means into the same frequency of said repetitively input frequency modulated field signal;
first signal switching means adapted to select a frequency modulated field signal output from said second frequency conversion means and delayed only by 0.5 horizontal scan period and said repetitively input frequency modulated field signal that is not delayed alternately at every vertical scan period to thereby output a frame signal;
brightness signal demodulation means adapted to demodulate a frequency modulated brightness signal component out of said frame signal output from said first signal switching means;
a first filter adapted to extract a chroma signal component out of a signal output from said signal delay means;
third frequency conversion means adapted to convert the frequency of a signal output from said first filter into a given frequency band in which a good chroma signal demodulation characteristic can be obtained;
a second filter adapted to extract a chroma signal component out of said repetitively input frequency modulated field signal;
fourth frequency conversion means adapted to convert the frequency of a signal output from said second filter into the same frequency of a signal output from said third frequency conversion means;
second signal switching means adapted to select the output signals of said third and fourth frequency conversion means alternately at every one vertical scan period to thereby out put a frame signal; and,
chroma signal demodulation means adapted to demodulate a chroma signal component out of said frame signal output from said second signal switching means.

10. A field/frame conversion circuit as set forth in claim 9, wherein said signal delay means is a glass delay line having a wide band frequency characteristic.

* * * * *